US012594663B2

(12) United States Patent　　　(10) Patent No.:　US 12,594,663 B2
Oka et al.　　　　　　　　　　　　(45) Date of Patent:　　　Apr. 7, 2026

(54) ROBOT SYSTEM AND CART

(71) Applicant: KAWASAKI JUKOGYO KABUSHIKI KAISHA, Hyogo (JP)

(72) Inventors: Tomoki Oka, Hyogo (JP); Shunsuke Arima, Hyogo (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 68 days.

(21) Appl. No.: 18/844,616

(22) PCT Filed: Mar. 7, 2023

(86) PCT No.: PCT/JP2023/008616
§ 371 (c)(1),
(2) Date: Sep. 6, 2024

(87) PCT Pub. No.: WO2023/171677
PCT Pub. Date: Sep. 14, 2023

(65) Prior Publication Data
US 2025/0187170 A1　　Jun. 12, 2025

(30) Foreign Application Priority Data
Mar. 8, 2022　　(JP) ................................ 2022-035740

(51) Int. Cl.
B25J 9/00　　　　(2006.01)
B25J 5/00　　　　(2006.01)
B25J 9/16　　　　(2006.01)
(52) U.S. Cl.
CPC ............. B25J 5/007 (2013.01); B25J 9/0087 (2013.01); B25J 9/1664 (2013.01)
(58) Field of Classification Search
CPC ........ B25J 5/007; B25J 9/0087; B25J 9/1664; B25J 9/162; B25J 9/1682; B25J 11/008;
(Continued)

(56) References Cited

U.S. PATENT DOCUMENTS

| 9,669,857 | B1 | 6/2017 | Rainey |
| 2012/0029697 | A1 | 2/2012 | Ota et al. |
| 2017/0217027 | A1 | 8/2017 | Boucard |

FOREIGN PATENT DOCUMENTS

| JP | 2008-246596 | | 10/2008 |
| JP | 2009-6415 | | 1/2009 |
| JP | 2009006415 | * | 1/2009 |

OTHER PUBLICATIONS

Official Communication issued in International Patent Application No. PCT/JP2023/008616, dated May 16, 2023, along with English translation thereof.

* cited by examiner

*Primary Examiner* — Dylan M Katz
(74) *Attorney, Agent, or Firm* — GREENBLUM & BERNSTEIN, P.L.C.

(57) ABSTRACT

A robot system includes a robot that includes a first robot arm provided with a first end effector, a second robot arm provided with a second end effector, a moving device on which the first robot arm and the second robot arm are mounted, and a control device; and a cart that includes a first support to which a plurality of wheels are attached, and a gripping portion. The first support includes, at a first end portion of the first support in a first direction, a recess for receiving a part of the robot. The control device causes the moving device to move the robot together with the cart while causing the first end effector and the second end effector to grip the gripping portion in a state where the part of the robot is fitted into the recess.

10 Claims, 15 Drawing Sheets

(58) Field of Classification Search
CPC .......... B25J 13/08; B25J 19/021; B25J 19/02;
B62B 5/0079
See application file for complete search history.

ROBOT SYSTEM AND CART

CROSS-REFERENCE TO RELATED APPLICATIONS

The present application is intended to prove the priority and the profit of JP2022-035740, which has been filed to the Japanese patent office on Mar. 8, 2022, and is cited as a part of the present application by referring to the entire application.

TECHNICAL FIELD

The present disclosure relates to a robot system and a cart.

BACKGROUND ART

For example, JP2008-246596A discloses a transfer robot that moves a hand cart. The robot includes a parallel link mechanism that includes three links and an output member coupled to tip ends of the three links, and a gripping mechanism that couples the output member and a gripping portion of the hand cart. The robot drives the three links to control a position and an attitude of the output member coupled to the hand cart, thereby controlling a relative position and a relative attitude of the hand cart with respect to the robot.

SUMMARY OF INVENTION

In JP2008-246596A, a positional relation between the robot and the hand cart can vary depending on an operation of the robot. Therefore, a control of the robot in consideration of a behavior of the hand cart becomes complicated. The present disclosure provides a cart and a robot system that simplifies a control of a robot in consideration of a behavior of the cart.

A robot system according to one aspect of the present disclosure includes a robot that includes a first robot arm provided with a first end effector, a second robot arm provided with a second end effector, a moving device on which the first robot arm and the second robot arm are mounted, and a control device controlling operations of the first robot arm, the second robot arm, the first end effector, the second end effector, and the moving device; and a cart that includes a first support to which a plurality of wheels are attached, and a gripping portion to be gripped by the first end effector and the second end effector. The first support includes, at a first end portion of the first support in a first direction, a recess for receiving a part of the robot. The control device causes the moving device to move the robot together with the cart while causing the first end effector and the second end effector to grip the gripping portion in a state in which the part of the robot is fitted into the recess.

DESCRIPTION OF EMBODIMENTS

Figure 1:
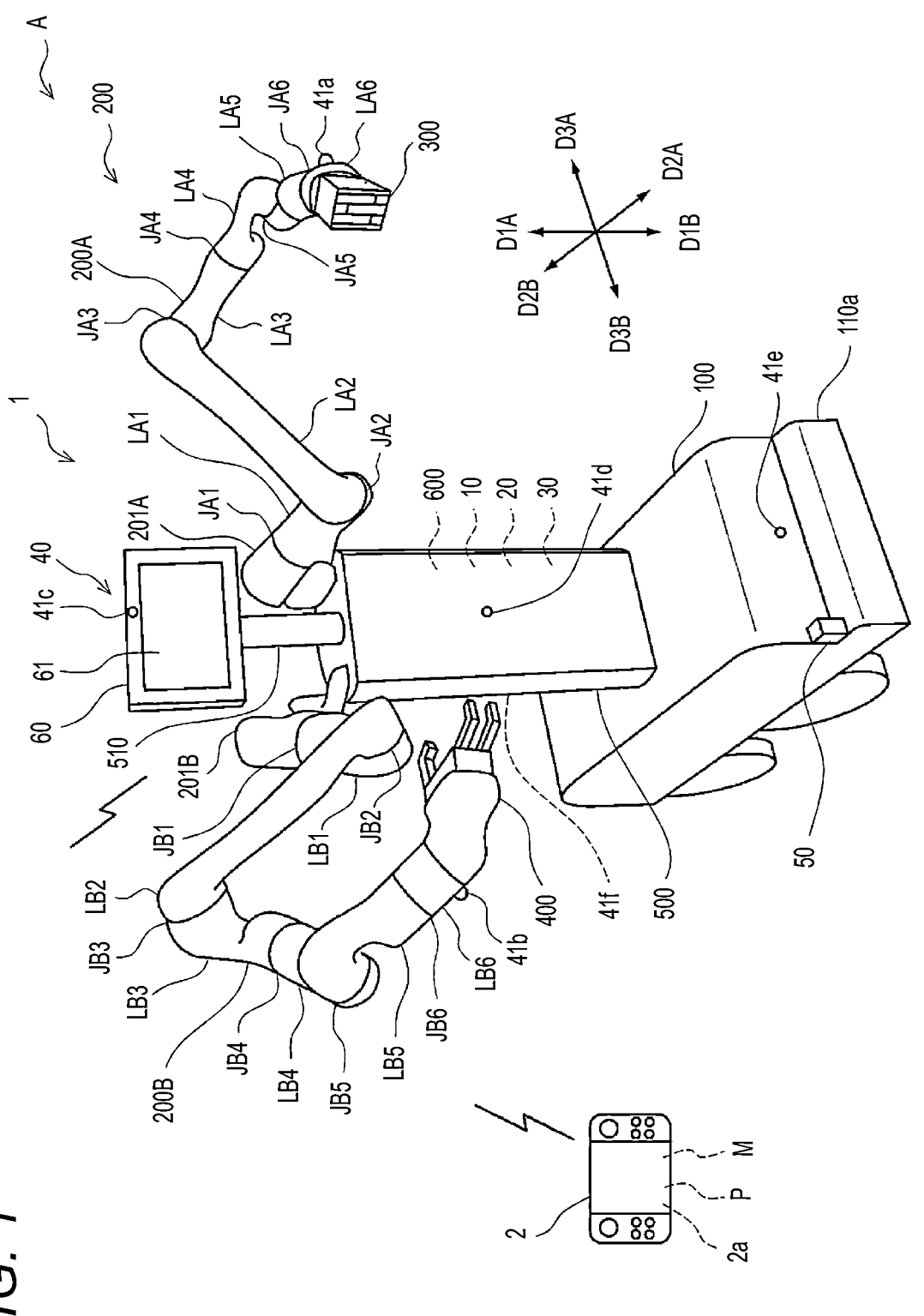
FIG. 1 is a diagram illustrating an example of a configuration of a robot system according to an embodiment.

Hereinafter, an exemplary embodiment of the present disclosure will be described with reference to the drawings. The embodiment described below shows a comprehensive or specific example. Among components in the following embodiment, components that are not described in the independent claims indicating the most significant concept will be described as any components. Each drawing in the attached drawings is a schematic drawing and is not necessarily strictly illustrated. In each of the drawings, substantially the same components are denoted by the same reference numerals, and redundant description may be omitted or simplified. In the present specification and claims, the "device" may mean not only one device but also a system including a plurality of devices.

Configuration of Robot System

An example of a configuration of a robot system A according to an exemplary embodiment will be described with reference to FIG. 1. FIG. 1 is a diagram illustrating the example of the configuration of the robot system A according to the embodiment. The robot system A includes a robot 1 and an input device 2.

Although not limited to the following, in the present embodiment, the input device 2 is arranged at a position away from the robot 1. The input device 2 receives input of a command, information, data, and the like by a user, and transmits the received command, information, data, and the like to the robot 1. The input device 2 receives a command, information, data, and the like from the robot 1. For example, the user who uses the input device 2 may be a manager of the robot system A, an operator of the robot 1, a service provider via the robot system A, or a service receiver via the robot system A.

The input device 2 includes a communication device 2a communicating with the robot 1, and a processing circuit including a processor P and a memory M. The communication between the communication device 2a and the robot 1 is a wireless communication, but may also be a wired communication or a combination of wired and wireless communications. Any wired communication or wireless communication may be used. The communication device 2a and the robot 1 may directly or indirectly perform the wireless communication. In the indirect wireless communication, the communication device 2a and the robot 1 may be connected to a communication network via a wired communication or a wireless communication, and may communicate with each other via the communication network. The communication device 2a may include a communication circuit.

The communication network is not particularly limited, and may include, for example, a local area network (LAN), a wide area network (WAN), the Internet, or a combination of two or more thereof. The communication network may use near field communication such as Bluetooth (registered trademark) and ZigBee (registered trademark), a network dedicated line, a communication carrier dedicated line, a public switched telephone network (PSTN), a mobile communication network, an Internet network, satellite communication, or a combination of two or more thereof. The mobile communication network may use a fourth-generation mobile communication system, a fifth-generation mobile communication system, and the like. The communication network can include one or a plurality of networks.

The input device 2 may include one or more of a computer such as a personal computer, a smart device such as a smartphone and a tablet computer, a personal digital assistant, a game terminal, a known teaching device such as a teach pendant used for a teaching operation to a robot, a known operation device of a robot, other operation devices, other terminal devices, a device using the above, and a device in which the above is improved. The input device 2 may be a dedicated device designed for the robot 1, and may be a general-purpose device available in a general market. When the input device 2 is a general-purpose device, a function of the input device 2 may be implemented by installing dedicated software.

The robot 1 performs an operation of providing a service to the user. The robot 1 can be used in various services such as care, medical, cleaning, security, guidance, rescue, cooking, commodity provision, and physical distribution. The robot 1 includes a moving device 100, one or more robot arms 200, a support 500, and a control device 600. The robot 1 includes a secondary battery module 10, a power supply circuit 20, a communication device 30, an imaging device 40, a sensor 50, and a presentation device 60. Although not limited to the following, in the present embodiment, a robot arm capable of functioning as an industrial robot arm is used as the robot arm 200. The imaging device 40 and the presentation device 60 may function as devices for communicating with the user around the robot 1.

Figure 2:
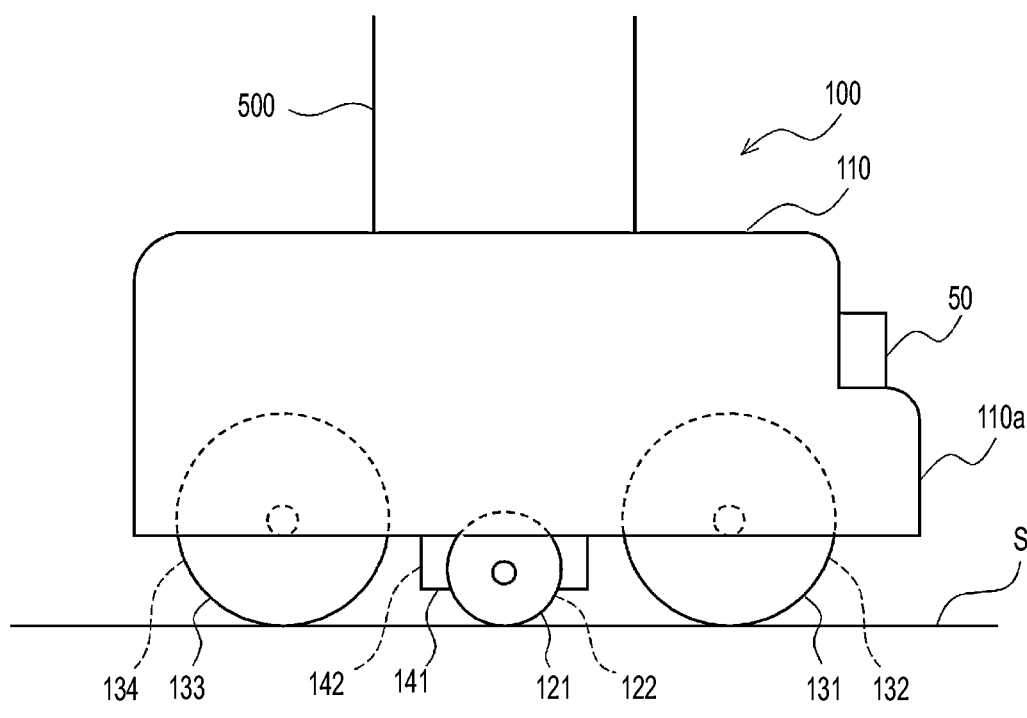
FIG. 2 is a side view of a moving device in FIG. 1.
Figure 2:
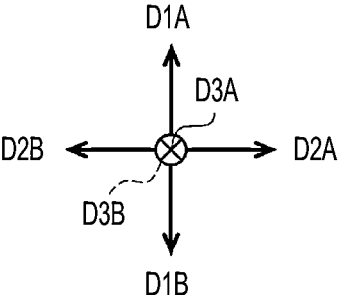

FIG. 2 is a side view of the moving device 100 in FIG. 1. As illustrated in FIG. 2, the moving device 100 is movable by itself, and travels by wheels in the present embodiment. The moving device 100 includes a main body 110, drive wheels 121 and 122, auxiliary wheels 131 to 134, and movement driving devices 141 and 142. The drive wheels 121 and 122 and the auxiliary wheels 131 to 134 are rotatably attached to the main body 110. The drive wheels 121 and 122 and the auxiliary wheels 131 to 134 are in contact with a support surface S on which the robot 1 is arranged, and support the main body 110 and the robot 1 from below.

Here, an upper direction D1A, a lower direction D1B, a front direction D2A, a rear direction D2B, a side direction D3A, and a side direction D3B are directions relative to the robot 1. The upper direction D1A is a direction from the moving device 100 toward the support 500, and coincides with a vertically upper direction perpendicular to the support surface S when the support surface S is horizontal. The lower direction D1B is a direction opposite to the upper direction D1A, and coincides with a vertically lower direction perpendicular to the support surface S when the support surface S is horizontal. The directions D2A and D2B are directions opposite to each other, and are directions perpendicular to the directions D1A and D1B. The front direction D2A is a forward direction of the moving device 100, and the rear direction D2B is a reverse direction of the moving device 100. The side directions D3A and D3B are directions opposite to each other, and are directions perpendicular to the directions D1A, D1B, D2A, and D2B. The directions D2A, D2B, D3A, and D3B extend in a horizontal direction when the support surface S is horizontal, and extend along the support surface S when the support surface S is flat. In the present specification and claims, the descriptions "perpendicular", "vertically", "horizontal", and "parallel" may include a completely perpendicular state, a completely vertical state, a completely horizontal state, and a completely parallel state, respectively, and may include a substantially perpendicular state, a substantially vertical state, a substantially horizontal state, and a substantially parallel state close to the completely perpendicular state, the completely vertical state, the completely horizontal state, and the completely parallel state, respectively.

Although not limited to the following, in the present embodiment, the auxiliary wheels 131 to 134 are arranged around the drive wheels 121 and 122 in the main body 110. Directions of respective rotation shafts of the auxiliary wheels 131 to 134 may be fixed, and the directions of the respective rotation shafts thereof may be changed like universal casters. The drive wheels 121 and 122 are arranged side by side in the side direction D3A to be rotatable on the same shaft extending in the side direction D3A. A direction of the rotation shaft of the drive wheels 121 and 122 is fixed with respect to the main body 110.

The movement driving devices 141 and 142 are respectively arranged in the main body 110 and rotationally drive the drive wheels 121 and 122. For example, each of the movement driving devices 141 and 142 includes a servo motor using electric power as a power source and serving as an electric actuator. The servo motors are controlled by the control device 600. The movement driving devices 141 and 142 can cause the moving device 100 to perform forward movement, reverse movement, and various turning by controlling a rotation direction and a rotation speed of the drive wheels 121 and 122.

A structure of the moving device 100 is not limited to the structure described above, and any structure can be used as long as the moving device 100 can be moved in various directions. For example, the moving device 100 may move by using other traveling means such as a crawler without using the wheels.

As illustrated in FIG. 1, the support 500 is arranged on the moving device 100 and is supported by the moving device 100. The support 500 has a columnar shape extending in the upper direction D1A from the moving device 100. The support 500 accommodates and supports various components of the robot 1. The support 500 includes a support column 510. The support column 510 extends in the upper direction D1A from the support 500 and supports the presentation device 60.

Although not limited to the following, in the present embodiment, the robot 1 includes two robot arms 200A and 200B as the robot arms 200. The robot arms 200A and 200B are arranged at an upper portion of the support 500 and are supported by the support 500. The robot 1 is a double-arm type robot. Each of the robot arms 200A and 200B includes two or more joints.

Figure 3:
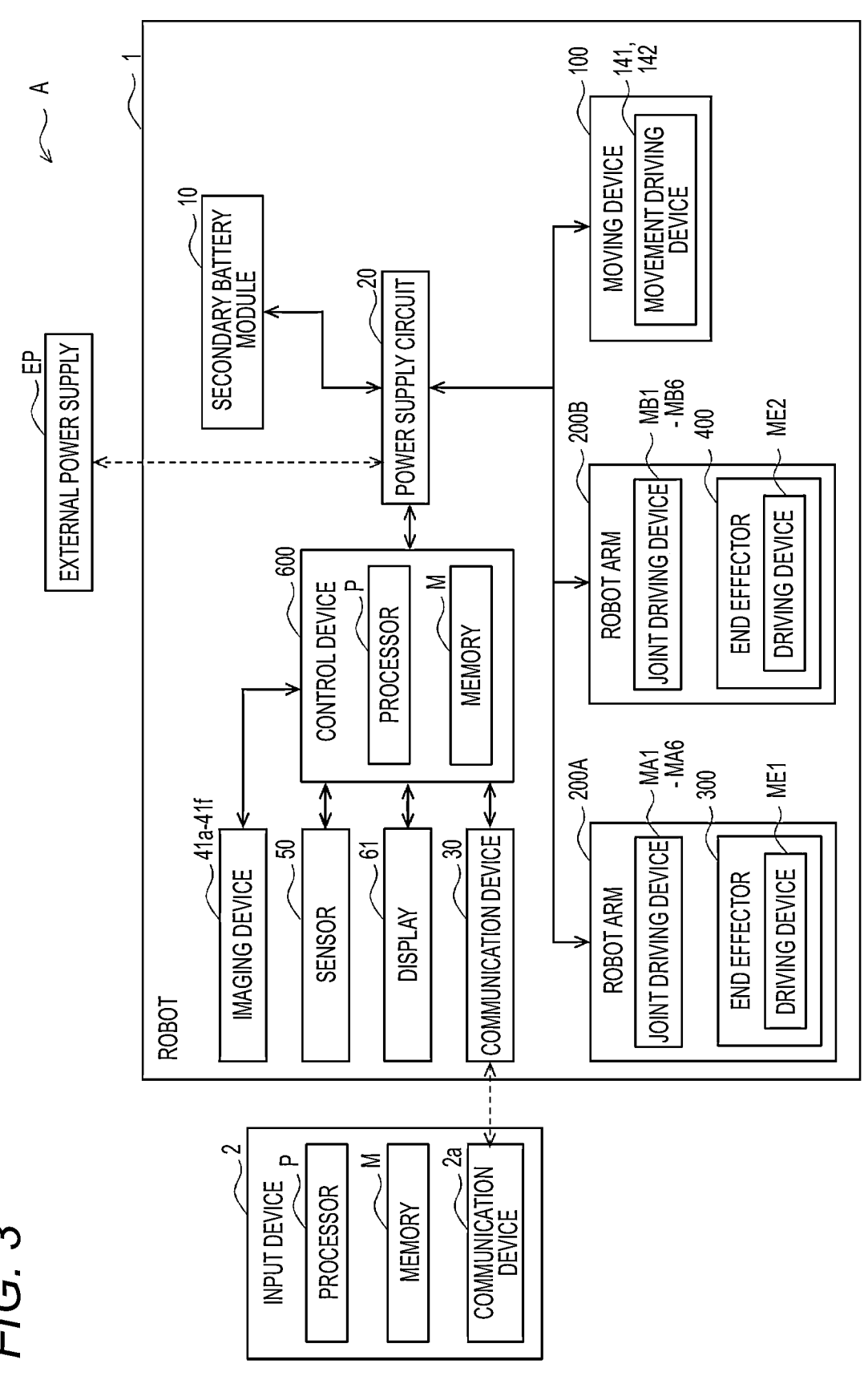
FIG. 3 is a block diagram illustrating an example of components of the robot system according to the embodiment.

Although not limited to the following, in the present embodiment, the robot arm 200A includes a base 201A, six links LA1 to LA6, six joints JA1 to JA6 that interconnect the base 201A and the links LA1 to LA6, joint driving devices MA1 to MA6 that drive the joints JA1 to JA6, and a first end effector 300. The robot arm 200B includes a base 201B, six links LB1 to LB6, six joints JB1 to JB6 that interconnect the base 201B and the links LB1 to LB6, joint driving devices MB1 to MB6 that drive the joints JB1 to JB6, and a second end effector 400. The joints JA1 to JA6 and JB1 to JB6 are rotary joints. Each of the joint driving devices MA1 to MA6 and MB1 to MB6 includes a servo motor using electric power as a power source and serving as an electric actuator. The servo motors are controlled by the control device 600. The joint driving devices MA1 to MA6 and MB1 to MB6 are illustrated in FIG. 3.

The bases 201A and 201B are fixed to the upper portion of the support 500. The bases 201A and 201B are arranged at positions on the support column 510 in the side directions D3A and D3B, respectively. The bases 201A and 201B are connected to the links LA1 and LB1 via the joints JA1 and JB1, respectively. The links LA1 and LB1 extend in directions along pivot shafts of the joints JA1 and JB1, respectively. The pivot shafts of the joints JA1 and JB1 extend in extending directions of the bases 201A and 201B, respectively. The pivot shaft of the joint JA1 extends along the front direction D2A, and is, for example, inclined from the front direction D2A toward the side direction D3A and the lower direction D1B as advancing in the front direction D2A. The pivot shaft of the joint JB1 extends along the front direction D2A, and is, for example, inclined from the front direction D2A toward the side direction D3B and the lower direction D1B as advancing in the front direction D2A.

The links LA2 and LB2 are connected to the links LA1 and LB1 via the joints JA2 and JB2, respectively. The links LA2 and LB2 extend in directions intersecting pivot shafts of the joints JA2 and JB2, and for example, extend in directions perpendicular to the pivot shafts of the joints JA2 and JB2, respectively. The pivot shafts of the joints JA2 and JB2 extend in directions intersecting the pivot shafts of the joints JA1 and JB1, and for example, extend in directions perpendicular to the pivot shafts of the joints JA1 and JB1, respectively.

The links LA3 and LB3 are connected to the links LA2 and LB2 via the joints JA3 and JB3, respectively. The links LA3 and LB3 extend in directions intersecting pivot shafts of the joints JA3 and JB3, and for example, extend in directions perpendicular to the pivot shafts of the joints JA3 and JB3, respectively. The pivot shafts of the joints JA3 and JB3 extend in directions along the pivot shafts of the joints JA2 and JB2, and for example, extend in directions parallel to the pivot shafts of the joints JA2 and JB2, respectively.

The links LA4 and LB4 are connected to the links LA3 and LB3 via the joints JA4 and JB4, respectively. The links LA4 and LB4 extend in directions along pivot shafts of the joints JA4 and JB4, respectively. The pivot shafts of the joints JA4 and JB4 extend in directions intersecting the pivot shafts of the joints JA3 and JB3, and for example, extend in directions perpendicular to the pivot shafts of the joints JA3 and JB3, respectively.

The links LA5 and LB5 are connected to the links LA4 and LB4 via the joints JA5 and JB5, respectively. The links LA5 and LB5 extend in directions intersecting pivot shafts of the joints JA5 and JB5, and for example, extend in directions perpendicular to the pivot shafts of the joints JA5 and JB5, respectively. The pivot shafts of the joints JA5 and JB5 extend in directions intersecting the pivot shafts of the joints JA4 and JB4, and for example, extend in directions perpendicular to the pivot shafts of the joints JA4 and JB4, respectively.

The links LA6 and LB6 are connected to the links LA5 and LB5 via the joints JA6 and JB6, respectively. The links LA6 and LB6 extend in directions along pivot shafts of the joints JA6 and JB6, respectively. The pivot shafts of the joints JA6 and JB6 extend in directions intersecting the pivot shafts of the joints JA5 and JB5, and for example, extend in directions perpendicular to the pivot shafts of the joints JA5 and JB5, respectively. Each of the links LA6 and LB6 includes a mechanical interface at a tip end thereof, and is physically and electrically connected to the end effector 300 or 400 via the mechanical interface.

The end effectors 300 and 400 are detachably attached to the links LA6 and LB6, respectively. The end effectors 300 and 400 are capable of applying an action to an object to be handled by the robot 1. The end effectors 300 and 400 may also be referred to as "robot hands" or "hands". The end effectors 300 and 400 include driving devices ME1 and ME2, and operate due to drive forces of the driving devices ME1 and ME2, respectively. Although not limited to the following, in the present embodiment, the end effectors 300 and 400 have the same structure. Further, each of the driving devices ME1 and ME2 includes a servo motor using electric power as a power source and serving as an electric actuator. The driving devices ME1 and ME2 are illustrated in FIG. 3. For example, a force sensor for detecting a direction and a magnitude of an acting force may be arranged at each of connection portions between the end effectors 300 and 400 and the links LA6 and LB6. The force sensor may be an inner force sensor. Details of the structures of the end effectors 300 and 400 will be described later.

The robot arms 200A and 200B as described above have a structure of a vertical articulated robot arm, and may have any structure. For example, the robot arms 200A and 200B may be horizontal articulated robot arms, other types of vertical articulated robot arms, polar coordinate robot arms, cylindrical coordinate robot arms, Cartesian coordinate robot arms, or other types of robot arms. The number of robot arms 200 may be one or more, and preferably two or more. The number of joints of each robot arm 200 may be two or more. The joints of the robot arm 200 are not limited to the rotary joints, and may include, for example, a prismatic joint.

The presentation device 60 presents various information to the user around the robot 1. Although not limited to the following, in the present embodiment, the presentation device 60 includes a display 61 attached to the support column 510. The display 61 displays an image of image data transmitted from the control device 600. The control device 600 may cause the display 61 to display an image for communicating with the user facing the robot 1, an image in response to a command received from the input device 2, an image for providing various other information to the user, and the like. The presentation device 60 may include a speaker that converts an audio signal into a sound wave and emits the sound wave as audio, a projector that projects an image, and the like. The speaker and the projector may output an audio and an image corresponding to an audio signal and an image signal transmitted from the control device 600, respectively.

The imaging device 40 includes imaging devices 41a to 41f, and detects various information around the robot 1. Each of the imaging devices 41a to 41f includes a camera that captures a digital image. One or more of the imaging devices 41a to 41f may include a three-dimensional camera capable of detecting a distance to a subject. Examples of the three-dimensional camera may include a stereo camera, a time-of-flight-camera (TOF camera), a pattern light projection camera such as fringe projection, and a camera using a light-section method. Each of the imaging devices 41a to 41f outputs data of the captured image to the control device 600. The control device 600 may use the image data acquired by the imaging devices 41a to 41f in a control performed by the control device 600 itself, and may output the image data to the input device 2. The control device 600 may perform an image process for extracting the subject from the image, detecting the distance from the camera to the subject, and the like.

The imaging devices 41a and 41b are arranged at the robot arms 200A and 200B, for example, are arranged at the links LA6 and LB6, and capture images of workpieces of the end effectors 300 and 400, respectively. The imaging device 41c is arranged at the display 61, and captures an image of the user facing the robot 1. The imaging device 41d is arranged at the support 500, and captures an image of the front of the robot 1. The imaging device 41e is arranged at the moving device 100, and captures an image of the support surface S in front of the robot 1 and the vicinity thereof. The imaging device 41f is arranged at the support 500, and captures an image of the rear of the robot 1. The robot 1 may include a microphone that acquires an audio from the surroundings thereof and outputs an audio signal of the audio. The microphone may output the audio signal to the control device 600.

The sensor 50 detects various information around the robot 1. The sensor 50 scans the periphery of the robot 1, and outputs a scan result to the control device 600. The control device 600 may use the scan result of the sensor 50 in the control performed by the control device 600 itself, and may output the scan result to the input device 2. Although not limited to the following, in the present embodiment, the sensor 50 is arranged in the moving device 100, and is oriented toward the front direction D2A. The sensor 50 is arranged at an end portion 110a of the main body 110 of the moving device 100 in the front direction D2A, specifically, is arranged on a step of the end portion 110a having a stepped shape. The sensor 50 may scan a horizontal range of spreading from the moving device 100 toward the front direction D2A and the side directions D3A and D3B. The sensor 50 may scan a vertical range including the support surface S and the vicinity thereof. The sensor 50 may be capable of detecting the support surface S and an object such as an article within the scanned ranges, and a distance to the object. Such a sensor 50 can detect a state of the support surface S in front of the robot 1 and the article on the support surface S as well as positions of various portions on the support surface S and a position of the article.

The sensor 50 performs detection using a light wave, a laser, magnetism, a radio wave, an electromagnetic wave, an ultrasonic wave or a combination of two or more thereof, and may include a photoelectric sensor, a laser sensor, a radio wave sensor, an electromagnetic wave sensor, an ultrasonic sensor, various lidars (LiDAR) or a combination of two or more thereof.

The control device 600, the secondary battery module 10, the power supply circuit 20, and the communication device 30 are arranged in the support 500. The secondary battery module 10 functions as an electric power source of the robot 1. The secondary battery module 10 includes one or more secondary batteries. The secondary battery is a battery capable of charging and discharging electric power. Examples of the secondary battery may include a lead storage battery, a lithium ion secondary battery, an all-solid-state battery, a nickel-hydrogen storage battery, and a nickel-cadmium storage battery.

The power supply circuit 20 controls supply and demand of the electric power to the secondary battery module 10 in response to a command and the like from the control device 600. For example, the power supply circuit 20 may include devices such as a converter, an inverter, a transformer, and an amplifier. The power supply circuit 20 receives electric power supplied from an external power supply EP such as a commercial power supply, and supplies the electric power to the secondary battery module 10 and stores the electric power while controlling the electric power. The power supply circuit 20 supplies the electric power stored in the secondary battery module 10 to components consuming electric power in the robot 1 while controlling the electric power. The external power supply EP is illustrated in FIG. 3.

The communication device 30 communicates with the communication device 2a of the input device 2. The communication device 30 has a structure suitable for communication to be used. The communication device 30 may include a communication circuit.

The control device 600 controls the entire robot 1. FIG. 3 is a block diagram illustrating an example of components of the robot system A according to the embodiment. As illustrated in FIG. 3, the control device 600 is communicably connected to the input device 2 via the communication device 30. The control device 600 controls operations of various components of the robot 1 in response to a command and the like received from the input device 2. The control device 600 controls operations of various components of the robot 1 according to a stored control program.

Examples of the components as control targets by the control device 600 may include the movement driving devices 141 and 142, the joint driving devices MA1 to MA6 and MB1 to MB6, the driving devices ME1 and ME2 of the end effectors 300 and 400, the power supply circuit 20, the communication device 30, the imaging devices 41a to 41f, the sensor 50, the display 61, and the like, but not all of the above are required.

When controlling the electric power supplied to the components, the control device 600 may output a command value of a current and the like to the power supply circuit 20 and supply the electric power of the power supply circuit 20 and the secondary battery module 10 to the components. The control device 600 may servo-control the servo motors. The control device 600 may acquire, from each servo motor, a detection result of a rotation sensor such as an encoder provided in the servo motor. The control device 600 may acquire a value of a supplied current to the servo motor from a current sensor that may be arranged at the servo motor, or from the power supply circuit 20. The control device 600 may determine a command value of a current to the servo motor by using the detection result of the rotation sensor and the value of the supplied current as feedback information.

The control device 600 may cause the components of the robot 1 to perform one or more of an operation in manual driving, an operation in autonomous driving, and an operation in a combination of the manual driving and the autonomous driving.

In the manual driving, the control device 600 may perform a control to operate the components of the robot 1 according to an operation content input to the input device 2 in a sequential manner. The control device 600 may perform the control according to a manual driving program.

In the autonomous driving, the control device 600 may perform a control such that the components of the robot 1 automatically, that is, autonomously operate a series of tasks corresponding to a command input to the input device 2. The control device 600 may perform the control according to an autonomous driving program corresponding to the tasks.

In the combination of the manual driving and the autonomous driving, the control device 600 may perform a control such that the components of the robot 1 appropriately execute the operation according to the operation content in a sequential manner and the operation of autonomously executing the series of tasks in response to the operation content and the command received from the input device 2. The control device 600 may perform the control according to a hybrid driving program obtained by combining the autonomous driving program and the manual driving program, and may perform the control according to the autonomous driving program and the manual driving program in a sequential manner.

Similarly to the input device 2, the control device 600 includes the processing circuit including the processor P and the memory M. For example, the control device 600 may be an electronic circuit board, an electronic control unit, a microcomputer, or other electronic devices. The processor P transmits and receives a command, information, data, and the like to and from other devices. The processor P inputs a signal from various devices and outputs a control signal to a control target.

For example, the memory M may include a volatile semi-conductor memory such as a random access memory (RAM), a nonvolatile semi-conductor memory such as a read-only memory (ROM), a hard disk, a solid state drive (SSD), or a combination of two or more thereof. The memory M stores a program to be executed by the processor P, various types of data, and the like.

At least a part of a plurality of functions of the control device 600 and the input device 2 may be implemented by cooperation of the processor P and the memory M. The processor P and the memory M including the RAM and the ROM form a computer system. For example, the computer system may implement the above functions by the processor P executing a program recorded in the ROM using the RAM as a work area.

A part or all of the functions of the control device 600 and the input device 2 may be implemented by the computer system, may be implemented by a dedicated hardware circuit such as an electronic circuit or an integrated circuit, and may be implemented by a combination of the computer system and the hardware circuit. For example, each of the control device 600 and the input device 2 may execute a process by centralized control by a single computer, and may execute a process by distributed control by cooperation of a plurality of computers.

Without being limited to the following, the processor P may include, for example, one or more of a central processing unit (CPU), a micro processing unit (MPU), a graphics processing unit (GPU), a microprocessor, a processor core, a multiprocessor, an application-specific integrated circuit (ASIC), a field programmable gate array (FPGA), and a reconfigurable processor. The processor P may implement a process by a logic circuit or a dedicated circuit which is a hardware circuit formed in, for example, an integrated circuit such as an integrated circuit (IC) chip and a large scale integration (LSI). The functions of the control device 600 and the input device 2 may be implemented by an integrated circuit that is individually integrated into one chip, and may be implemented by an integrated circuit that is integrated into one chip so as to include a part or all of the functions.

Details of the end effectors 300 and 400 will be described later. Since the end effectors 300 and 400 have the same structure, only the details of the end effector 300 will be described below, and the detailed description of the end effector 400 will be omitted.

Figure 4:
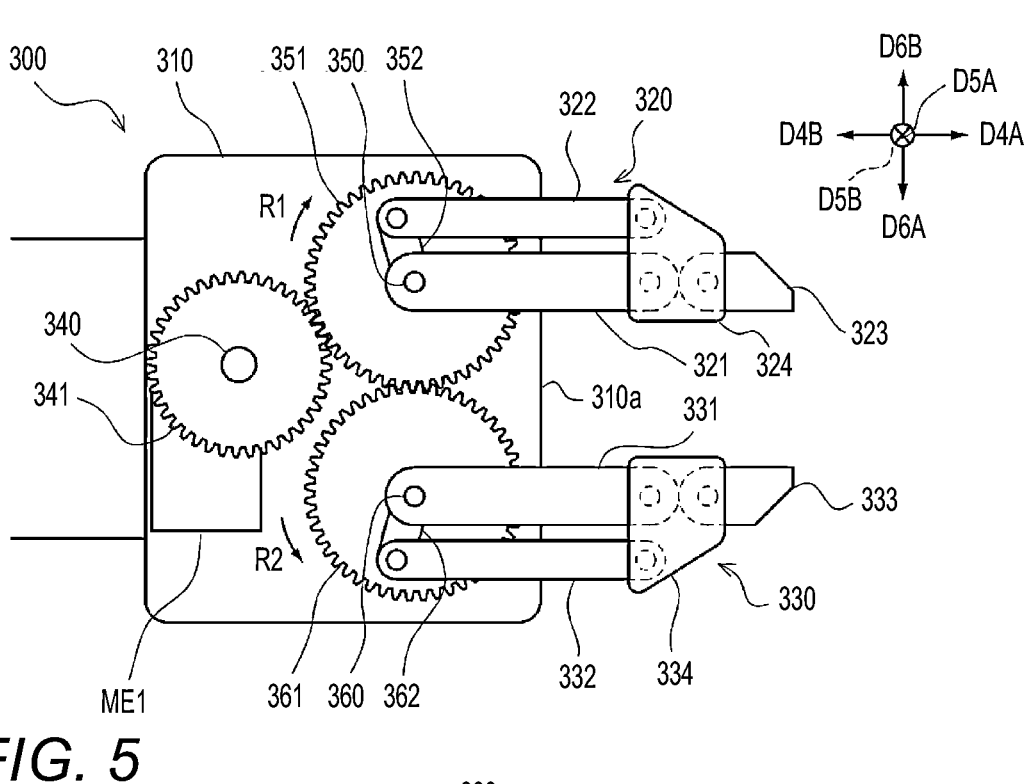
FIG. 4 is a side view illustrating an example of components in one state of an end effector of the robot in FIG. 1.
Figure 5:
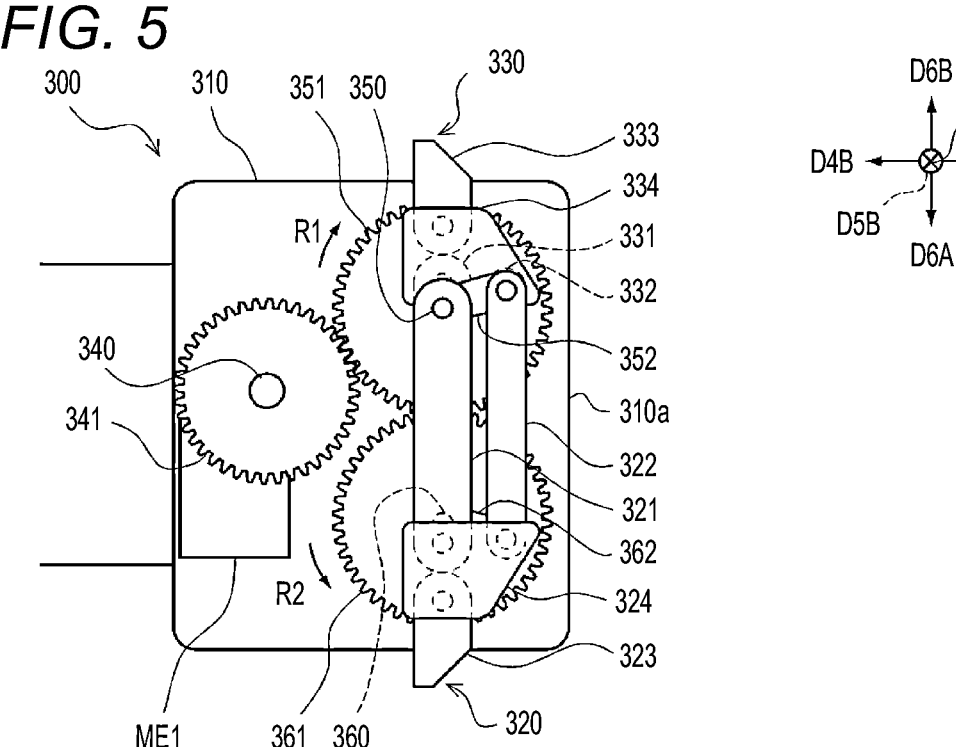
FIG. 5 is a side view illustrating an example of the components in the other state of the end effector of the robot in FIG. 1.

FIGS. 4 and 5 are side views illustrating examples of components in two different states of the end effector 300 of the robot 1 in FIG. 1. FIGS. 4 and 5 show the inside of a main body 310 of the end effector 300. As illustrated in FIG. 4, the end effector 300 includes the main body 310, two first holding portions 320, one second holding portion 330, one driving device ME1, one drive shaft 340, two first driven shafts 350, and one second driven shaft 360. The main body 310 includes a mechanical interface connected to the mechanical interface of the link LA6 or LB6 of the robot arm 200A or 200B.

The driving device ME1, the drive shaft 340, the two first driven shafts 350, and the second driven shaft 360 are arranged in the main body 310. The drive shaft 340 is connected to the driving device ME1 so as to be rotationally driven by the driving device ME1. The two first driven shafts 350 are engaged with the drive shaft 340 by gears. The second driven shaft 360 is engaged with one of the first driven shafts 350 by gears. Each of two first driven gears 351 rotating integrally with the two first driven shafts 350 is directly or indirectly engaged with a drive gear 341 rotating integrally with the drive shaft 340. In the indirect engagement, the first driven gear 351 may be engaged with the drive gear 341 via a gear. The two first driven gears 351 may be arranged on one first driven shaft 350, and one of the first driven shafts 350 may be engaged with the drive gear 341. Two drive gears 341 may be arranged on the drive shaft 340 and be engaged with the two first driven gears 351, respectively.

A second driven gear 361 rotating integrally with the second driven shaft 360 is engaged with one of the first driven gears 351. The driving device ME1 rotationally drives the driven shafts 350 and 360 in directions opposite to each other via the drive shaft 340. The two first driven shafts 350 may be arranged side by side in a direction D5A, and may be arranged coaxially, for example. The two first driven gears 351 are arranged side by side in the direction D5A. Therefore, in FIGS. 4 and 5, the first driven shaft 350 positioned in a direction D5B of the two first driven shafts 350 and the first driven gear 351 positioned in the direction D5B of the two first driven gears 351 are illustrated.

Here, directions D4A, D4B, D5A, D5B, D6A, and D6B illustrated in FIGS. 4 and 5 are directions relative to the end effector 300. The direction D4A is a direction away from the main body 310, and the direction D4B is a direction opposite to the direction D4A. The directions D5A and D5B are directions opposite to each other, and are directions perpendicular to the directions D4A and D4B. The directions D6A and D6B are directions opposite to each other, and are directions that are perpendicular to the directions D4A and D4B and intersect the directions D5A and D5B. Although not limited to the following, in the present embodiment, the directions D6A and D6B are directions perpendicular to the directions D5A and D5B.

The holding portions 320 and 330 are arranged at an end portion 310a of the main body 310 in the direction D4A. The two first holding portions 320 are arranged side by side in the direction D5A. Therefore, in FIGS. 4 and 5, only the first holding portion 320 positioned in the direction D5B of the two first holding portions 320 is illustrated. The second holding portion 330 is arranged in the direction D6A with respect to the two first holding portions 320, and is arranged between the two first holding portions 320 in the direction D5A. For example, the end portion 310a may be positioned on a side opposite to the mechanical interface of the main body 310.

Each of the two first holding portions 320 includes a first link 321, a second link 322, a tip end link 323, and an intermediate link 324. In each of the two first holding portions 320, a proximal end of the first link 321 is connected to one of the first driven shafts 350 so as to pivot integrally, and a proximal end of the second link 322 is pivotally connected to a pivoting member 352 that pivots integrally with the same first driven shaft 350. In each of the two first holding portions 320, the links 321 and 322 are pivotally connected to the intermediate link 324 at respective tip ends thereof, and extend along each other. In the state illustrated in FIG. 4, the second link 322 is positioned in the direction D6B with respect to the first link 321. A proximal end of the tip end link 323 is pivotally connected to the intermediate link 324 on a side opposite to connection portions between the links 321 and 322 and the intermediate link 324.

Similarly to the first holding portion 320, the second holding portion 330 includes a first link 331, a second link 332, a tip end link 333, and an intermediate link 334. Although not limited to the following, in the present embodiment, the second holding portion 330 has a structure similar to that of the first holding portion 320, and has a structure symmetrical to the first holding portion 320 with respect to an axis extending in the directions D4A and D4B. A proximal end of the first link 331 is connected to the second driven shaft 360 so as to pivot integrally, and a proximal end of the second link 332 is pivotally connected to a pivoting member 362 that pivots integrally with the second driven shaft 360.

In the end effector 300 in the state illustrated in FIG. 4, when the driving device ME1 rotationally drives the two first driven shafts 350 in a direction R1 via the drive shaft 340, one of the first driven shafts 350 rotationally drives the second driven shaft 360 in a direction R2 opposite to the direction R1. The end effector 300 is in the state illustrated in FIG. 5. Since the two first driven shafts 350 and the two pivoting members 352 pivot in the direction R1, the two first holding portions 320 pivot toward the direction R1 about the two first driven shafts 350 while maintaining a state in which the links 321 and 322 extend along each other. Since the second driven shaft 360 and the pivoting member 362 pivot in the direction R2, the second holding portion 330 pivots toward the direction R2 about the second driven shaft 360 while maintaining a state in which the links 331 and 332 extend along each other.

Accordingly, the end effector 300 can not only sandwich and grip the object by the tip end links 323 and 333 of the holding portions 320 and 330 but also house the holding portions 320 and 330 in the main body 310. The robot 1 can perform not only an operation using the holding portions of the end effectors 300 and 400 but also an operation using the main bodies of the end effectors 300 and 400.

In the end effector 300, the first links 321 and 331 may be pivotally connected to the driven shafts 350 and 360, respectively. The end effector 300 may include a stop mechanism that stops, restrains or locks the pivoting of the first links 321 and 331 with respect to the driven shafts 350 and 360. When the stop mechanism causes the first links 321 and 331 not to pivot, the end effector 300 may operate as illustrated in FIGS. 4 and 5. When the stop mechanism allows the first links 321 and 331 to pivot, the end effector 300 may operate to pivot the intermediate links 324 and 334 with respect to the first links 321 and 331.

Figure 6:
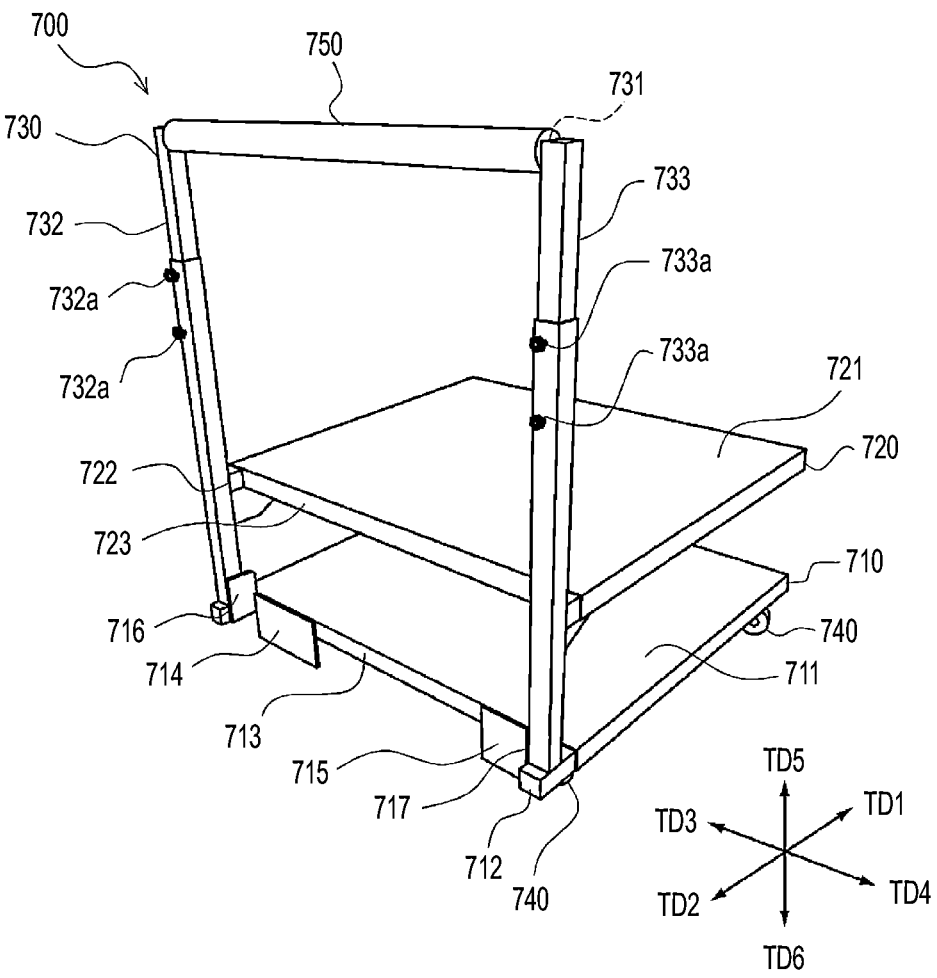
FIG. 6 is a perspective view illustrating an example of components of a cart according to the embodiment.

Components of a cart 700 used by the robot 1 will be described. FIG. 6 is a perspective view illustrating an example of the components of the cart 700 according to the embodiment. As illustrated in FIG. 6, the cart 700 has a structure of a hand cart. The cart 700 includes a first support plate 710, a second support plate 720, a support frame 730, a plurality of wheels 740, and a handle 750. The first support plate 710 is an example of a first support, the second support plate 720 is an example of a second support, and the handle 750 is an example of a gripping portion.

Although not limited to the following, in the present embodiment, the first support plate 710 has a plate shape, and has, for example, a rectangular plate shape. The first support plate 710 includes a recess 713 in an end portion 712 of the first support plate 710 in a direction TD2. The recess 713 is recessed from the end portion 712 toward a direction TD1 opposite to the direction TD2. The recess 713 has a shape and a size for receiving the end portion 110a of the main body 110 of the moving device 100.

Here, directions TD1, TD2, TD3, TD4, TD5, and TD6 are directions relative to the cart 700. The directions TD1, TD2, TD3, and TD4 are directions in which the plate-shaped first support plate 710 extends, for example, directions in which a surface 711 of the first support plate 710 extends. The directions TD1 and TD2 are directions opposite to each other. The directions TD3 and TD4 are directions opposite to each other, and are directions perpendicular to the directions TD1 and TD2. The directions TD5 and TD6 are directions opposite to each other, and are directions perpendicular to the directions TD1, TD2, TD3, and TD4. The direction TD6 is a direction from the first support plate 710 toward the plurality of wheels 740, and coincides with the vertically lower direction perpendicular to the support surface S when the cart 700 is arranged on the horizontal support surface S.

Figure 7:
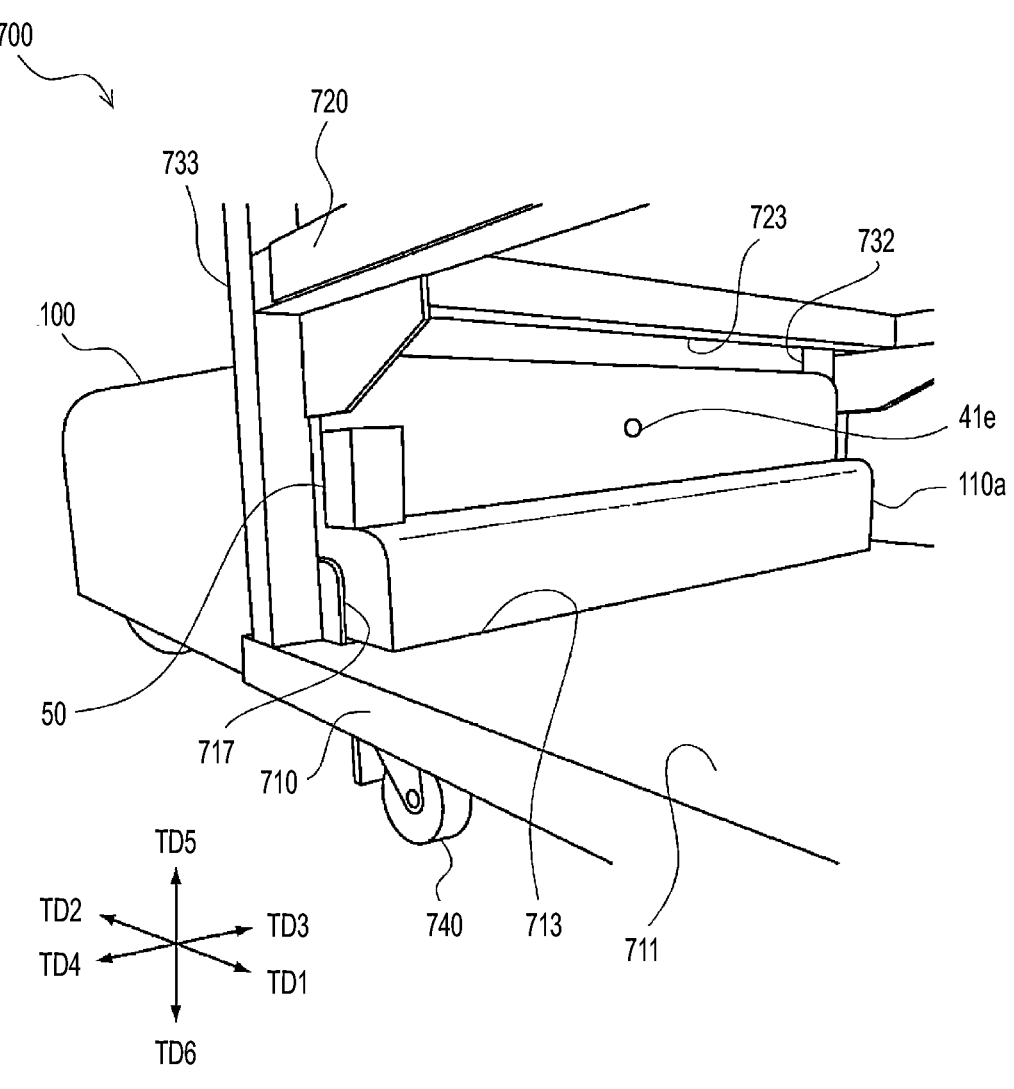
FIG. 7 is a perspective view illustrating an example of an engaged state between the cart and the moving device of the robot according to the embodiment.

In the present embodiment, as illustrated in FIG. 7, the recess 713 has a shape and a size for matching the end portion 110a in the direction TD1 and the directions TD3 and TD4. FIG. 7 is a perspective view illustrating an example of an engaged state between the cart 700 and the moving device 100 of the robot 1 according to the embodiment. For example, the recess 713 and the end portion 110a have a rectangular shape in a plan view as viewed in the direction TD6. The recess 713 may have a shape and a size for matching any portion of the end portion 110a in the upper and lower directions D1A and D1B. The upper and lower directions D1A and D1B are illustrated in FIG. 2. In the present embodiment, the recess 713 has a shape and a size for matching a portion of the end portion 110a in the lower direction D1B with respect to the sensor 50.

As illustrated in FIG. 6, the cart 700 includes receiving portions 714 to 717 in an inner surface of the recess 713. The receiving portions 714 to 717 have a plate shape. The receiving portions 714 and 715 are arranged in the inner surface of the recess 713 positioned in the direction TD1. Surfaces of the receiving portions 714 and 715 are arranged toward the direction TD2. The receiving portion 716 is arranged in the inner surface of the recess 713 positioned in the direction TD3. A surface of the receiving portion 716 is arranged toward the direction TD4. The receiving portion 717 is arranged in the inner surface of the recess 713 positioned in the direction TD4. A surface of the receiving portion 717 is arranged toward the direction TD3. Dimensions of the receiving portions 714 to 717 in the direction TD5 are larger than a dimension of the end portion 712 of the first support plate 710 in the direction TD5.

When the end portion 110a of the moving device 100 is fitted into the recess 713, the receiving portions 714 to 717 may abut the end portion 110a. The receiving portions 714 to 717 increase a contact area with the end portion 110a as compared with a case in which only the inner surface of the recess 713 is in contact with the end portion 110a. The receiving portions 714 to 717 may reduce an impact at the time of contact between the first support plate 710 and the end portion 110a. Each of one or more of the receiving portions 714 to 717 may include, in a surface thereof, a cushioning material that cushions the impact at the time of contact with the end portion 110a. Material examples of the cushioning material may include rubbers, sponges, other resins, or a combination of two or more of thereof.

The plurality of wheels 740 are arranged in the direction TD6 with respect to the first support plate 710, and are attached to the first support plate 710. Although not limited to the following, in the present embodiment, the cart 700 includes four wheels 740, and the four wheels 740 have a structure of a caster. One or more of the four wheels 740 may have a structure of a universal caster. When the cart 700 is arranged on the support surface S, the wheels 740 support the cart 700 from below in a movable manner.

The support frame 730 extends from the end portion 712 of the first support plate 710 toward the direction TD5. Although not limited to the following, in the present embodiment, the support frame 730 has a vertically inverted U shape. The support frame 730 includes a horizontal member 731 positioned in the direction TD5 and extending in the direction TD3, a vertical member 732 positioned in the direction TD3 and extending in the direction TD5, and a vertical member 733 positioned in the direction TD4 and extending in the direction TD5. End portions of the vertical members 732 and 733 in the direction TD5 are connected to both ends of the horizontal member 731, and end portions of the vertical members 732 and 733 in the direction TD6 are connected to the first support plate 710. The vertical members 732 and 733 are examples of an obstacle and a third support.

In the present embodiment, the vertical members 732 and 733 are stretchable in the directions TD5 and TD6. For example, the vertical members 732 and 733 have a nested structure, and may have other structures. Screws 732a and 733a are respectively arranged on the vertical members 732 and 733, and are engaged or disengaged with the vertical members 732 and 733 by screw turning so as to restrain or release the stretch of the vertical members 732 and 733. The lengths of the vertical members 732 and 733 in the direction TD5 may be fixed.

The handle 750 is arranged on the horizontal member 731 and extends to reach the vertical members 732 and 733. Although not limited to the following, in the present embodiment, the handle 750 has a bar shape extending in a lateral direction. The handle 750 may extend from the vertical member 732 to the vertical member 733, and may be divided into two or more parts. The handle 750 may have a structure suitable for the gripping by the end effectors 300 and 400, and may have, for example, a structure including a cross-sectional shape, a cross-sectional dimension, a surface friction coefficient, a hardness, or a combination of two or more of thereof, which are suitable for the gripping by the end effectors 300 and 400.

End portions 722 of the second support plate 720 in the direction TD2 are attached to the vertical members 732 and 733 between the handle 750 and the first support plate 710. The second support plate 720 may be fixed to the vertical members 732 and 733 so as to move in the directions TD5 and TD6 in accordance with the stretch of the vertical members 732 and 733, and may be fixed to the vertical members 732 and 733 so as not to change positions in the directions TD5 and TD6 regardless of the stretch of the vertical members 732 and 733.

The second support plate 720 is arranged at an interval from the first support plate 710 toward the direction TD5. In the present embodiment, a height position of the second support plate 720 in the direction TD5 in the cart 700 is set to be higher than a height position of the sensor 50 in the upper direction D1A in the robot 1. For example, a height position of a lower end portion of the second support plate 720 in the direction TD5 in the cart 700 is set to be higher than a height position of an upper end portion of the sensor 50 in the upper direction D1A in the robot 1. Further, no other members are present between the support plates 710 and 720 except for connection members and connection reinforcement members between the vertical members 732 and 733 and the second support plate 720, and the vertical members 732 and 733. Accordingly, interference to the scanned ranges of the sensor 50 is reduced.

The second support plate 720 has a plate shape, and has, for example, a rectangular plate shape. The second support plate 720 extends along the first support plate 710 from the vertical members 732 and 733 toward the direction TD1. Although not limited to the following, in the present embodiment, the second support plate 720 is parallel to the first support plate 710. In a plan view as viewed in the direction TD6, the contour of the second support plate 720 may have a shape and a size that overlap the contour of the first support plate 710. Accordingly, even when a transferred object is placed on a surface 721 of the second support plate 720, the cart 700 is stabilized.

The second support plate 720 includes a recess 723 at an end portion 722. The recess 723 is recessed from the end portion 722 toward the TD1. The recess 723 may have a shape and a size for receiving the end portion 110a of the moving device 100. In the plan view as viewed in the direction TD6, the contour of the recess 723 may have a shape and a size that overlap the contour of the recess 713. The recess 723 may have a shape and a size for receiving a portion of the end portion 110a at a height position corresponding to the height position of the second support plate 720.

Operations of Robot System

Figure 8:
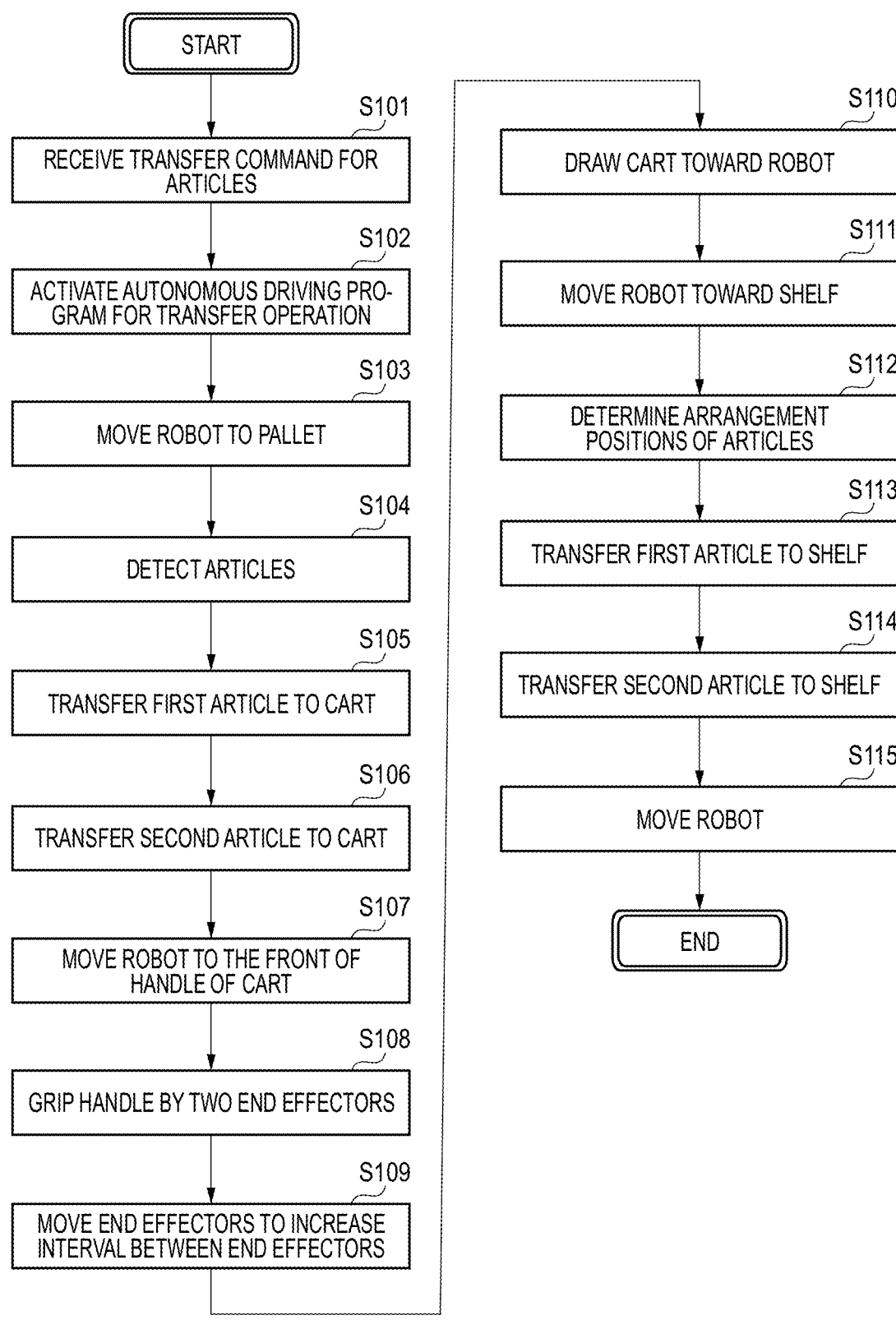
FIG. 8 is a flowchart illustrating an example of operations of the robot system according to the embodiment.

An example of operations of the robot system A according to the embodiment will be described with reference to FIG. 8. FIG. 8 is a flowchart illustrating the example of the operations of the robot system A according to the embodiment. FIGS. 9 to 11 and FIGS. 13 to 16 are plan views each illustrating an example of a state of the robot 1 included in the operations of FIG. 8. FIG. 12 is a front view of the robot 1 in the state illustrated in FIG. 11. In the operations illustrated in FIG. 8, the robot 1 transfers an article by using the cart 700 in the autonomous driving. For example, the robot system A can be used for merchandise display work in a commercial facility, merchandise picking work in a warehouse, and the like.

In step S101, the input device 2 receives a transfer command for transferring articles W1 and W2 on a pallet PA to a shelf RA. The input device 2 transmits, to the robot 1, the transfer command, position information on the pallet PA, information on the articles W1 and W2, position information on the shelf RA, and information on arrangement positions of the articles W1 and W2 in the shelf RA.

In step S102, the control device 600 activates an autonomous driving program for a transfer operation of the robot 1, and executes a subsequent control of the robot 1 according to the autonomous driving program. The autonomous driving program is a program for causing the robot 1 to autonomously transfer an object from a starting point to a destination point by using the cart 700. The starting point refers to the pallet PA, the destination point refers to the shelf RA, and the object refers to the articles W1 and W2. The robot 1 grips the handle 750 of the cart 700 by using the end effectors 300 and 400 at the time of activating the autonomous driving program.

In step S103, the control device 600 performs a control such that the robot 1 moves to the pallet PA together with the cart 700 while the moving device 100 is operated and the imaging device 40 captures an image. The control device 600 performs a control such that the robot 1 moves while avoiding an obstacle by using map information stored in the memory M, a result of the image process on the image data acquired by the imaging device 40, and the like.

Figure 9:
FIG. 9 is a plan view illustrating an example of a state of the robot included in the operations of FIG. 8.
Figure 9:
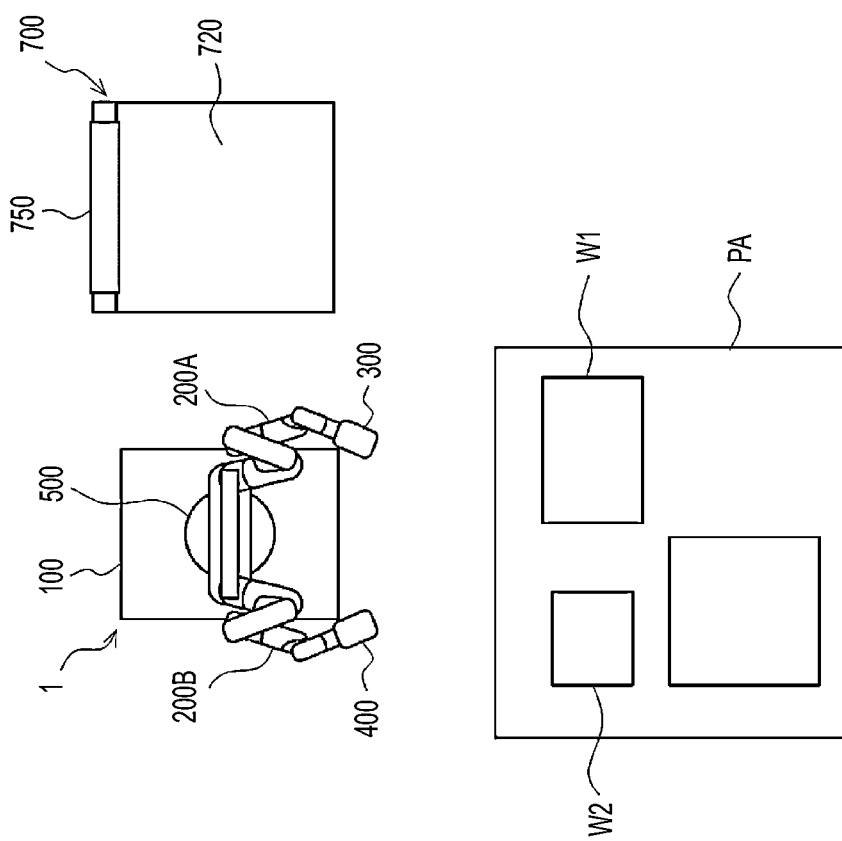

In step S104, as illustrated in FIG. 9, when the robot 1 and the cart 700 arrive at a predetermined position in the vicinity of the pallet PA, the control device 600 causes the robot 1 to leave the cart 700 and move alone to the front of the pallet PA. When the robot 1 arrives at the front of the pallet PA, the control device 600 performs a control such that the imaging device 40 captures an image of the pallet PA. The control device 600 performs the image process on the image data acquired by the imaging device 40 so as to identify the articles W1 and W2 on the pallet PA and detect positions, shapes, and sizes of the articles W1 and W2. Further, the control device 600 determines destination positions on the second support plate 720 of the cart 700 at which the articles W1 and W2 are to be arranged. In the subsequent control, the control device 600 causes the robot 1 to operate while causing the imaging device 40 to capture an image. Further, the control device 600 adjusts positions and attitudes of the end effectors 300 and 400 and the cart 700 by using the result of the process on the image data acquired by the imaging device 40 and the like.

Figure 10:
FIG. 10 is a plan view illustrating an example of the state of the robot included in the operation of FIG. 8.
Figure 10:
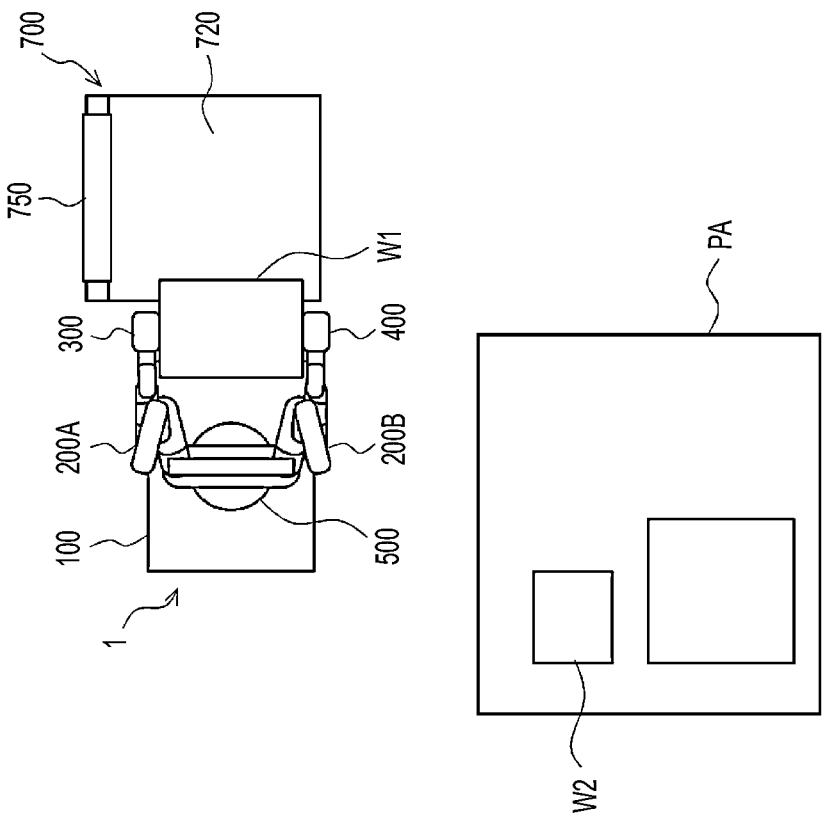

In step S105, the control device 600 performs the image process on the image data acquired by the imaging device 40 to determine gripping positions of the end effectors 300 and 400 on the article W1 and a position of the robot 1 in front of the pallet PA at the time of gripping the article W1. Further, as illustrated in FIG. 10, the control device 600 causes the robot 1 to transfer the article W1 from the pallet PA to the destination position on the second support plate 720 of the cart 700. At this time, the control device 600 causes the end effectors 300 and 400 to operate in the state illustrated in FIG. 5, and causes the robot arms 200A and 200B to grip the article W1 so as to sandwich the article W1 from both sides by the main bodies of the end effectors 300 and 400.

The control device 600 may adjust a force of the robot arms 200A and 200B for gripping the article W1 by using loads of the joint driving devices of the robot arms 200A and 200B, detection results of the force sensors arranged at the connection portions between the end effectors 300 and 400 and the robot arms 200A and 200B, or two or more thereof.

In step S106, as in step S105, the control device 600 causes the robot 1 to transfer the article W2 from the pallet PA to the destination position on the second support plate 720 of the cart 700.

In step S107, the control device 600 causes the robot 1 to move to the front of the handle 750 of the cart 700. The robot 1 is positioned in the direction TD2 with respect to the cart 700.

Figure 11:
FIG. 11 is a plan view illustrating an example of the state of the robot included in the operations of FIG. 8.
Figure 11:
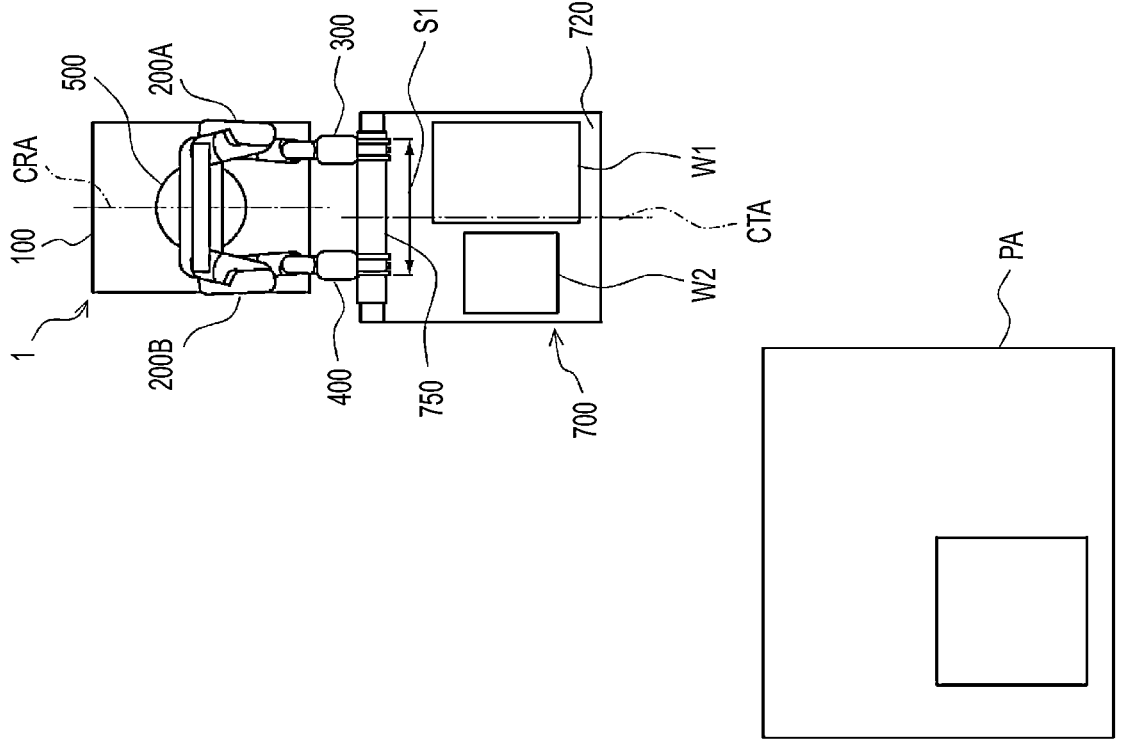
Figure 12:
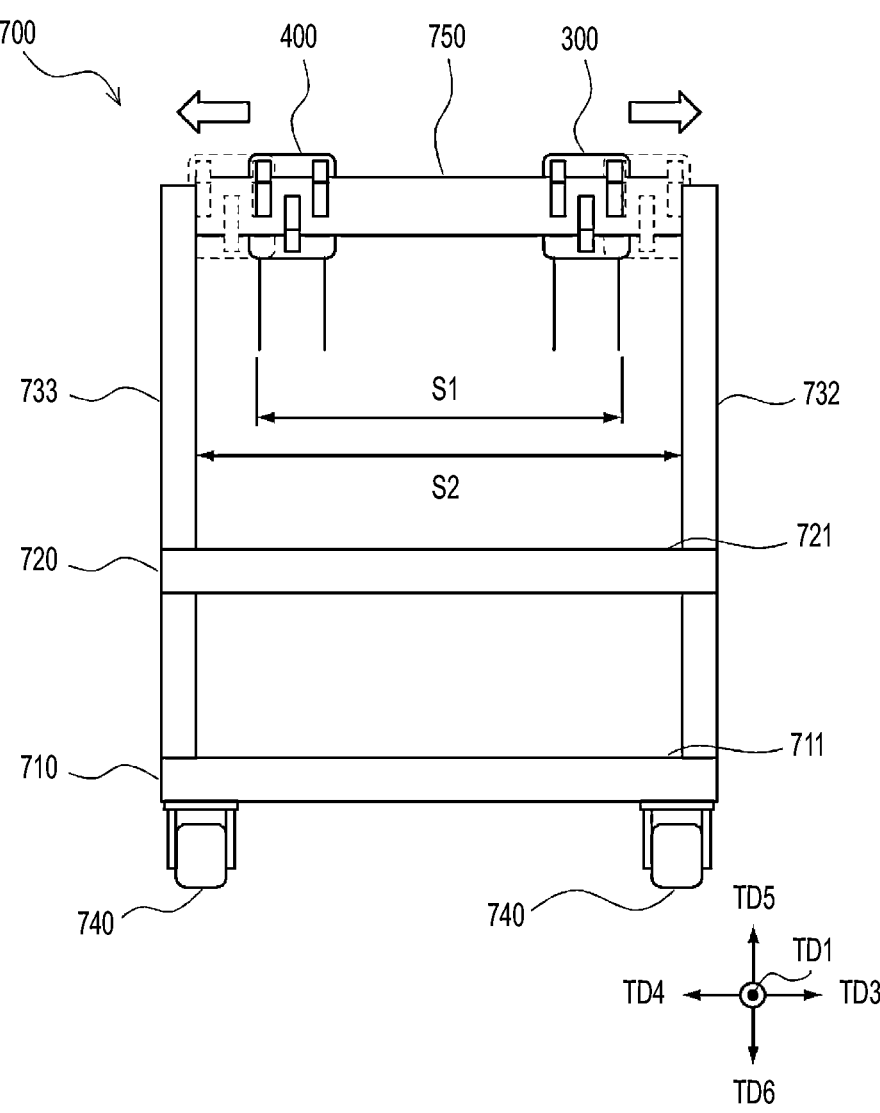
FIG. 12 is a front view of the robot in the state illustrated in FIG. 11.

In step S108, as illustrated in FIG. 11, the control device 600 causes the robot arms 200A and 200B to move the end effectors 300 and 400 onto the handle 750, and causes the end effectors 300 and 400 to grip the handle 750. In a gripped state, distances from a central axis of the robot 1 extending in the upper and lower directions DA1 and DA2 to the end effectors 300 and 400 are equal distances. The central axis of the robot 1 is an axis set in advance in the robot 1, and may be, for example, a central axis set in the support 500.

At this time, the control device 600 causes the end effectors 300 and 400 to operate from the state illustrated in FIG. 5 to the state illustrated in FIG. 4. Further, as illustrated in FIG. 12, the control device 600 causes the robot arms 200A and 200B to move the end effectors 300 and 400 onto the handle 750 such that an interval between the end effectors 300 and 400 is a first interval S1 smaller than the length between both ends of the handle 750. The end effector 300 is positioned in the vicinity of the vertical member 732, and the end effector 400 is positioned in the vicinity of the vertical member 733. The length between both ends of the handle 750 may be the length in the direction TD3. The length between both ends of the handle 750 may be a dimension of a gap between the vertical members 732 and 733 in the direction TD3.

For example, the control device 600 stores one or both of the length between both ends of the handle 750 and the first interval S1 in the memory M in advance. The control device 600 may determine and use the first interval S1 based on the length between both ends of the handle 750, and may use the first interval S1 stored in the memory M.

The control device 600 may detect the length between both ends of the handle 750 by using one or both of a result of the process on image data showing the handle 750 and the vertical members 732 and 733, which is captured by the imaging device 40, and a detection result of the handle 750 and the vertical members 732 and 733 by a sensor. The sensor may be the sensor 50, and may be a sensor that is similar to the sensor 50 and is arranged at another position on the robot 1. The control device 600 may determine the first interval S1 by using the detection result.

The first interval S1 between the end effectors 300 and 400 may be an interval at which one or both of the end effectors 300 and 400 gripping the handle 750 are not in contact with the vertical members 732 and 733. The first interval S1 between the end effectors 300 and 400 may be an interval at which a gap is generated between the end effector 300 and the vertical member 732 or/and between the end effector 400 and the vertical member 733. For example, the first interval S1 between the end effectors 300 and 400 may be an interval between centers of the main bodies of the end effectors 300 and 400, an interval between portions of the main bodies of the end effectors 300 and 400 on lateral outward sides thereof, or an interval between the first holding portions of the end effectors 300 and 400 on the lateral outward sides thereof.

The portion of the main body 310 of the end effector 300 on the lateral outward side refers to a portion of the main body 310 on the lateral outward side in the direction TD3, and the portion of the main body of the end effector 400 on the lateral outward side refers to a portion of the main body on the lateral outward side in the direction TD4. The first holding portion 320 of the end effector 300 on the lateral outward side refers to the first holding portion 320 positioned in the direction TD3 of the two first holding portions 320, and a first holding portion of the end effector 400 on the lateral outward side refers to a first holding portion positioned in the direction TD4 of two first holding portions.

Figure 13:
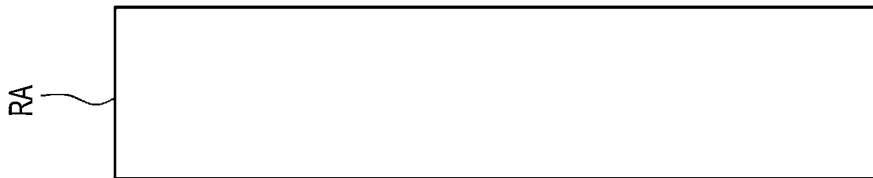
FIG. 13 is a plan view illustrating an example of the state of the robot included in the operations of FIG. 8.
Figure 13:
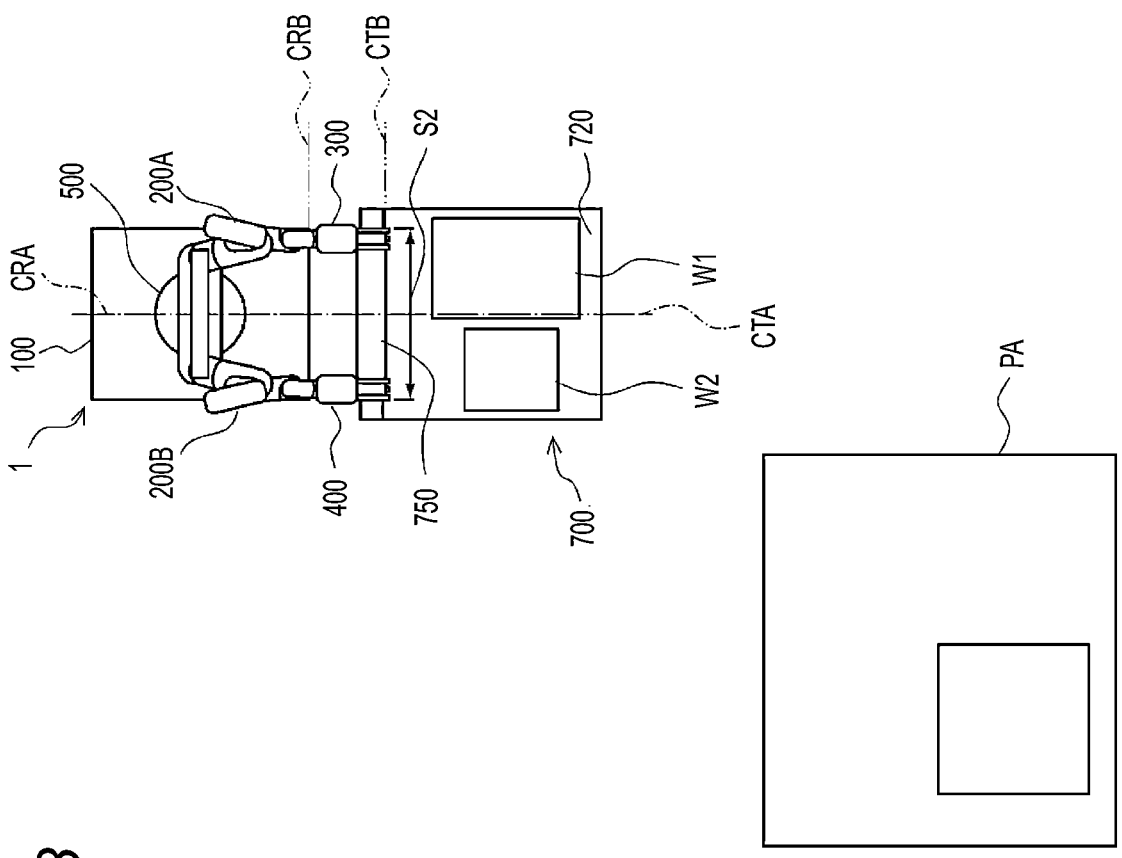

In step S109, as illustrated in FIGS. 12 and 13, the control device 600 causes the robot arms 200A and 200B to move the end effectors 300 and 400 such that the interval between the end effectors 300 and 400 is set to a second interval S2 larger than the first interval S1. In FIG. 12, the end effectors 300 and 400 at the second interval S2 are depicted by broken lines.

Although not limited to the following, in the present embodiment, the second interval S2 is an interval between the end effectors 300 and 400 that is equal to the length between both ends of the handle 750. When the control device 600 moves the end effectors 300 and 400 to reach the second interval S2, the cart 700 may be moved in the direction TD3 or TD4 by one or both of the end effectors 300 and 400 pushing the vertical members 732 and 733, respectively. For example, the control device 600 may move the end effectors 300 and 400 according to the second interval S2 stored in the memory M. The control device 600 may stop the movement of the end effectors 300 and 400 when the interval between the end effectors 300 and 400 reaches the second interval S2.

The second interval S2 may be an interval at which both the end effectors 300 and 400 gripping the handle 750 are in contact with the vertical members 732 and 733. The second interval S2 may be an interval at which no gap is generated between the end effector 300 and the vertical member 732 and between the end effector 400 and the vertical member 733.

For example, when the end effectors 300 and 400 are in contact with the vertical members 732 and 733, the main bodies of the end effectors 300 and 400 may be in contact with the vertical members 732 and 733, and the first holding portions of the end effectors 300 and 400 may be in contact with the vertical members 732 and 733. The gap between the end effector 300 and the vertical member 732 may be a gap between the main body 310 and the vertical member 732, and may be a gap between the first holding portions 320 and the vertical member 732. The gap between the end effector 400 and the vertical member 733 may be a gap between the main body of the end effector 400 and the vertical member 732, and may be a gap between the first holding portions of the end effector 400 and the vertical member 732.

The control device 600 may detect the contacts between the end effectors 300 and 400 and the vertical members 732 and 733, and stop the movement of the end effectors 300 and 400 at the time of detecting the contacts. The control device 600 may detect the contacts by using the result of the process on the image data acquired by the imaging device 40, the loads of the joint driving devices of the robot arms 200A and 200B, the detection results of the force sensors arranged at the connection portions between the end effectors 300 and 400 and the robot arms 200A and 200B, or two or more thereof.

When the interval between the end effectors 300 and 400 is increased to the second interval S2, the control device 600 causes the robot arms 200A and 200B to move the end effectors 300 and 400 such that the respective distances from the central axis of the robot 1 extending in the upper and lower directions DA1 and DA2 to the end effectors 300 and 400 are maintained to equal distances.

Accordingly, the cart 700 is positioned at the center of the robot 1 in the side directions D3A and D3B of the robot 1. For example, when the operation in step S108 is completed, as illustrated in FIG. 11, in the plan view, a central axis CRA of the robot 1 in the side directions D3A and D3B may be displaced from a central axis CTA of the cart 700 in the directions TD3 and TD4. According to the operation in step S109, the central axis CRA of the robot 1 and the central axis CTA of the cart 700 may coincide with each other in the side directions D3A and D3B.

The second interval S2 is not limited to the length between both ends of the handle 750. For example, when there are obstacles preventing the movement of the end effectors 300 and 400 in the directions TD3 and TD4, such as protrusions, on the handle 750, the second interval S2 may be equal to the length between the obstacles. The second interval S2 may be an interval at which the movement of the end effectors 300 and 400 toward the directions TD3 and TD4 exceeding the second interval S2 is physically prevented by the components of the cart 700. The vertical members 732 and 733 are also examples of the obstacles.

Figure 14:
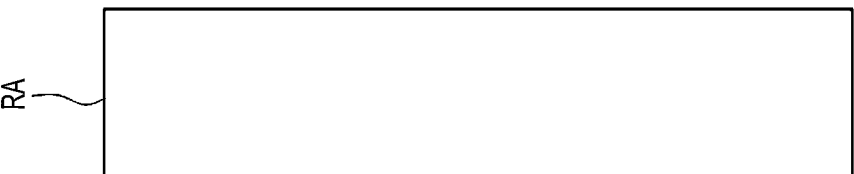
FIG. 14 is a plan view illustrating an example of the state of the robot included in the operations of FIG. 8.
Figure 14:
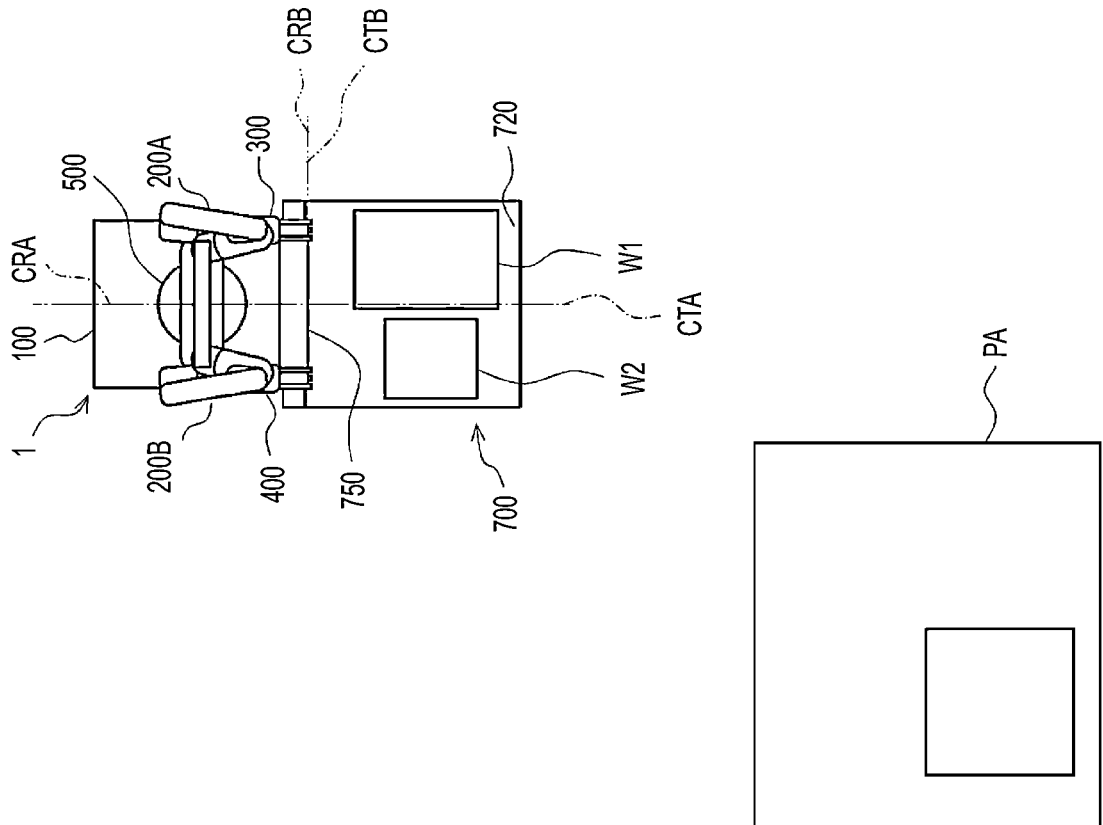

In step S110, as illustrated in FIG. 14, the control device 600 causes the robot arms 200A and 200B to move the end effectors 300 and 400 so as to draw the cart 700 toward the robot 1. Specifically, as illustrated in FIG. 7, the control device 600 causes the robot arms 200A and 200B to draw the cart 700 toward the rear direction D2B until the end portion 110*a* of the moving device 100 is fitted into the recess 713 of the cart 700. At this time, the control device 600 performs a control such that the end effectors 300 and 400 uniformly move to maintain the respective distances from the central axis of the robot 1 extending in the upper and lower directions DA1 and DA2 to the end effectors 300 and 400 to equal distances. Since the sensor 50 is positioned between the support plates 710 and 720 of the cart 700, the support plates 710 and 720 keep the interference to the scanned ranges of the sensor 50 low, and the articles W1 and W2 on the second support plate 720 do not interfere with the scanned ranges of the sensor 50.

The control device 600 may stop the drawing when the receiving portions 714 and 715 of the recess 713 reach positions in which the receiving portions 714 and 715 abut the end portion 110*a*, and may stop the drawing when the recess 713 reaches a predetermined position with respect to the end portion 110*a*. The control device 600 stores a position at which the drawing of the cart 700 is stopped in the memory M in advance. The control device 600 may stop the drawing of the cart 700 according to the stop position stored in the memory M. Accordingly, the cart 700 is positioned at a predetermined position in the front and rear directions D2A and D2B with respect to the robot 1.

For example, when the operation in step S109 is completed, as illustrated in FIG. 13, in the plan view, an axis CRB extending in the side direction D3A along the end portion 110*a* of the moving device 100 is separated at a distance from an axis CTB extending in the direction TD3 along the receiving portions 714 and 715 of the recess 713 of the cart 700. The distance may vary at each timing of the completion of the operation in step S109. According to the operation in step S110, the axis CRB of the robot 1 and the axis CTB of the cart 700 may coincide with each other or may be positioned at a constant interval in the front and rear directions D2A and D2B.

Accordingly, a footprint including an occupied region of the robot 1 and an occupied region of the cart 700 is formed as a constant footprint having a predetermined shape and size. When the robot 1 does not hold the cart 700, the control device 600 performs a position control of the robot 1 by using a footprint of the robot 1, and when the robot 1 holds the cart 700, the control device 600 performs the position control of the robot 1 by using the footprint including the robot 1 and the cart 700. Since the footprint including the robot 1 and the cart 700 is constant, the control device 600 can easily and reliably perform the position control of the robot 1.

When the stop position is a position in which the receiving portions 714 and 715 abut the end portion 110*a*, the cart 700 is restrained from moving in the rear direction D2B and the side directions D3A and D3B with respect to the moving device 100 due to the fitting between the recess 713 and the end portion 110*a*. The cart 700 is restrained from moving in the front direction D2A by brakes of the joint driving devices of the robot arms 200A and 200B.

When the stop position is a position in which the receiving portions 714 and 715 do not abut the end portion 110*a*, the cart 700 is restrained from moving in the side directions D3A and D3B with respect to the moving device 100 due to the engagement between the recess 713 and the end portion 110*a*. The cart 700 is restrained from moving in the front and rear directions D2A and D2B by the brakes of the joint driving devices of the robot arms 200A and 200B.

In any case related to the stop position, when the robot 1 moves together with the cart 700 in a state in which the end effectors 300 and 400 grip the handle 750, the cart 700 is restrained from laterally swinging in the side directions D3A and D3B with respect to the robot 1 when the robot 1 turns, and the robot 1 smoothly turns. Further, a load applied to the holding portions of the end effectors 300 and 400 by the handle 750 is reduced.

The control device 600 may detect the shape and the size of the recess 713 by using one or both of a result of the process on image data showing the recess 713, which is captured by the imaging device 40, and a detection result of the recess 713 by a sensor. The sensor may be the sensor 50, and may be a sensor that is similar to the sensor 50 and is arranged at another position on the robot 1. The control device 600 may determine the stop position of the cart 700 by using the detection result.

The control device 600 may detect the contacts between the receiving portions 714 and 715 and the end portion 110*a*, and stop the movement of the end effectors 300 and 400 at the time of detecting the contacts. The control device 600 may detect the contacts by using the result of the process on the image data acquired by the imaging device 40, the loads of the joint driving devices of the robot arms 200A and 200B, the detection results of the force sensors arranged at the connection portions between the end effectors 300 and 400 and the robot arms 200A and 200B, the detection result of the sensor for detecting the recess 713, or two or more thereof.

Figure 15:
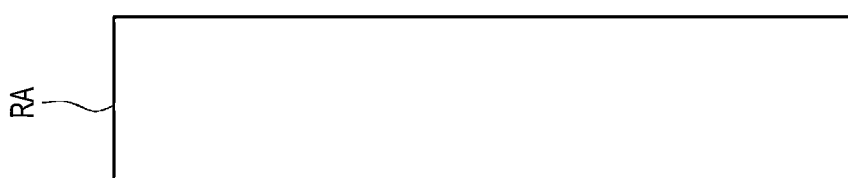
FIG. 15 is a plan view illustrating an example of the state of the robot included in the operations of FIG. 8.
Figure 15:
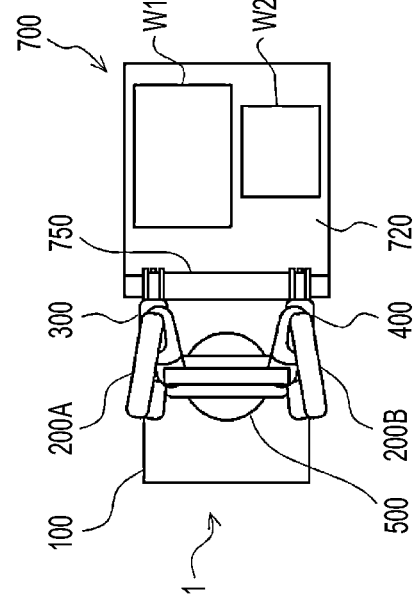
Figure 15:
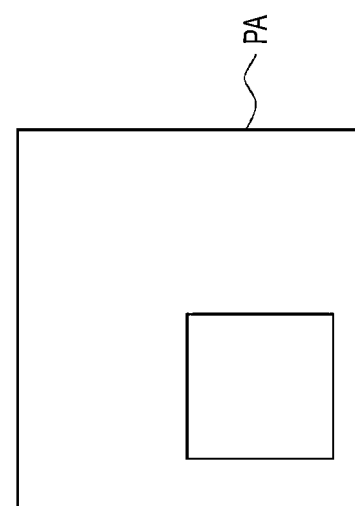

In step S111, as illustrated in FIG. 15, the control device 600 performs a control such that the robot 1 moves to the shelf RA together with the cart 700 while the moving device 100 is operated and the imaging device 40 captures an image. The control device 600 performs a control such that the robot 1 moves while avoiding an obstacle by using map information stored in the memory M, a result of the image process on the image data acquired by the imaging device 40, and the like.

In step S112, when the robot 1 and the cart 700 arrive at a predetermined position in the vicinity of the shelf RA, the control device 600 causes the robot 1 to leave the cart 700 and move alone to the front of the shelf RA. When the robot 1 arrives at the front of the shelf RA, the control device 600 performs a control such that the imaging device 40 captures an image of the shelf RA. The control device 600 performs the image process on the image data acquired by the imaging device 40 to determine destination positions on the shelf RA in which the articles W1 and W2 are to be arranged.

Figure 16:
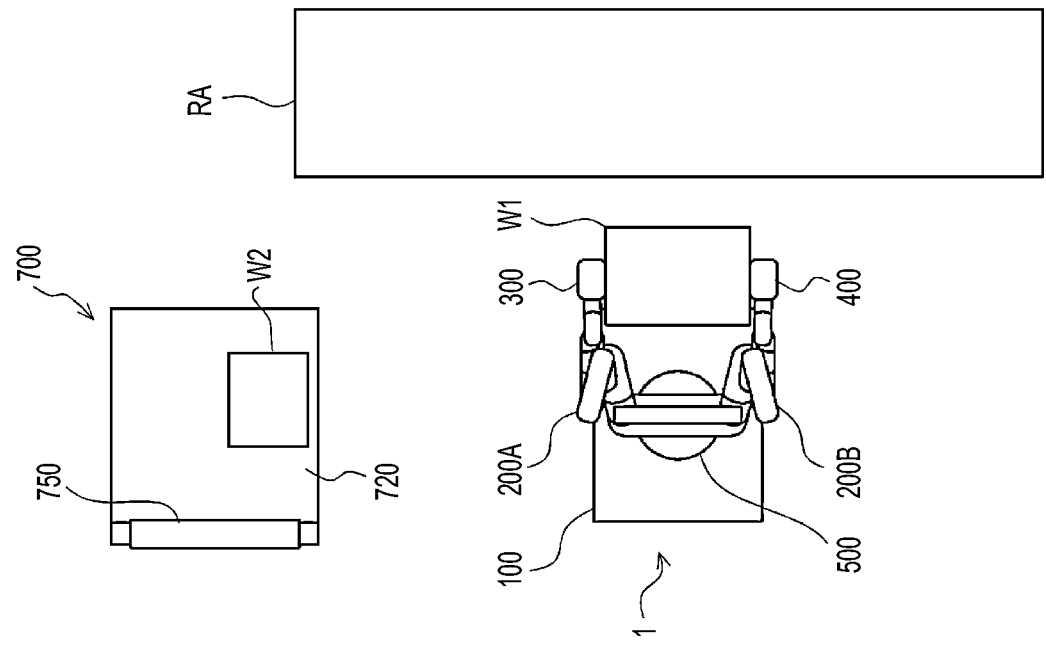
FIG. 16 is a plan view illustrating an example of the state of the robot included in the operations of FIG. 8.
Figure 16:
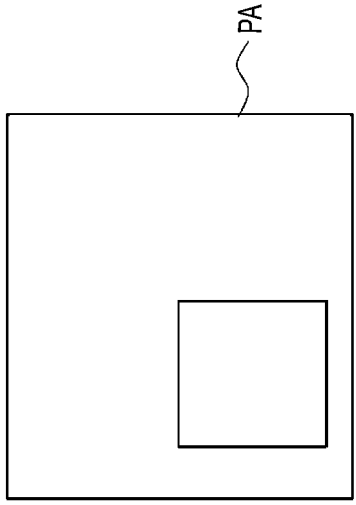

In step S113, the control device 600 performs the image process on the image data acquired by the imaging device 40 to determine the gripping positions of the end effectors 300 and 400 on the article W1 and a position of the robot 1 in front of the cart 700 at the time of gripping the article W1. Further, as illustrated in FIG. 16, the control device 600 causes the robot 1 to transfer the article W1 from the cart 700 to the destination position on the shelf RA. At this time, the control device 600 causes the end effectors 300 and 400 to operate in the state illustrated in FIG. 5, and causes the robot arms 200A and 200B to grip the article W1 via the main bodies of the end effectors 300 and 400. As in step S105, the control device 600 may adjust the force by which the robot arms 200A and 200B grip the article W1.

In step S114, as in step S113, the control device 600 causes the robot 1 to transfer the article W2 from the cart 700 to the destination position on the shelf RA.

In step S115, the control device 600 operates the moving device 100 so as to move the robot 1 to a predetermined standby position or a place specified via the input device 2.

Other Embodiments

Although the example of the embodiment of the present disclosure has been described above, the present disclosure is not limited to the embodiment described above. That is, various modifications and improvements may be made within the scope of the present disclosure. For example, embodiments obtained by applying various modifications to the embodiment and embodiments constructed by combining components in different embodiments are also included in the scope of the present disclosure.

In the embodiment, the robot 1 is used as a robot for providing a service to a person, and may be used for other applications. For example, the robot 1 may be used for a work in a factory, a warehouse, and the like.

In the robot 1 according to the embodiment, the support 500 may have a structure capable of moving the robot arms 200A and 200B up and down in the upper and lower directions D1A and D1B. For example, the support 500 may have a stretchable structure such as a nested structure. The support column 510 may have a structure capable of moving the display 61 up and down in the upper and lower directions D1A and D1B. For example, the support column 510 may have a stretchable structure such as a nested structure, and may have a structure in which the support column 510 itself moves in the upper and lower directions D1A and D1B. A drive source for the support 500 and the support column 510 may be an electric actuator such as a servo motor, and may be an actuator that is operated by other power sources such as a gas pressure and a hydraulic pressure.

In the robot 1 according to the embodiment, the robot arms 200A and 200B are arranged in one moving device 100, but the present disclosure is not limited thereto. For example, the robot arms 200A and 200B may be arranged in an object that is not movable. The robot arms 200A and 200B may be arranged in different objects.

Although the cart 700 according to the embodiment includes the two support plates 710 and 720, the cart 700 may include one support plate, and may include three or more support plates. In the cart, the article may be placed on any support plate. In the cart, the recess may be formed in one or more support plates.

Examples of aspects of the technique of the present disclosure are as follows. A robot system according to one aspect of the present disclosure includes a robot that includes a first robot arm provided with a first end effector, a second robot arm provided with a second end effector, a moving device on which the first robot arm and the second robot arm are mounted, and a control device controlling operations of the first robot arm, the second robot arm, the first end effector, the second end effector, and the moving device; and a cart that includes a first support to which a plurality of wheels are attached, and a gripping portion to be gripped by the first end effector and the second end effector. The first support includes, at a first end portion of the first support in a first direction, a recess for receiving a part of the robot. The control device causes the moving device to move the robot together with the cart while causing the first end effector and the second end effector to grip the gripping portion in a state in which the part of the robot is fitted into the recess.

According to the above aspect, it is possible to position the cart with respect to the robot in a direction approaching the robot and a direction separating from the robot. A fitting portion between the recess of the cart and the part of the robot effectively carries a load generated in a connection portion between the robot and the cart when the robot moves together with the cart, and largely reduces the loads received by the end effectors and the robot arms from the cart. When the cart moves together with the robot, the cart is restrained from moving with respect to the robot. Therefore, a control of the robot in consideration of a behavior of the cart is simplified.

In the robot system according to the aspect of the present disclosure, the robot may further include a sensor that scans a periphery of the robot, the cart may further include a second support that is arranged away from the first support in a second direction intersecting the first direction and that has, on a side opposite to the first support, a placement surface on which an article is placed, and in the cart, the first support and the second support may be arranged such that the sensor is positioned between the first support and the second support in the state in which the part of the robot is fitted into the recess.

According to the above aspect, a scanned range of the sensor is secured by a gap between the first support and the second support. Since the article is placed on the placement surface of the second support, the article on the cart does not affect the scanned range of the sensor. Accordingly, even when the cart moves together with the robot, it is possible to reliably operate the sensor. Therefore, a control of the robot in consideration of a behavior of the cart is simplified.

In the robot system according to the aspect of the present disclosure, the cart may further include, at the first end portion of the first support, a third support supporting the gripping portion. According to the above aspect, the third support is arranged at the first end portion at which the recess is arranged. In the state in which the part of the robot is fitted into the recess, the third support is restrained from interfering with the scanned range of the sensor.

In the robot system according to the aspect of the present disclosure, a second end portion of the second support in the first direction may be fixed to the third support. According to the above aspect, the third support supports the second support. In the state in which the part of the robot is fitted into the recess, a supported portion of the second support is restrained from interfering with the scanned range of the sensor.

In the robot system according to the aspect of the present disclosure, the second support may include, at the second end portion of the second support in the first direction, a recess for receiving a part of the robot. According to the above aspect, the area of the fitting portion between the robot and the cart increases. The fitting portions between the recesses of the cart and the robot effectively carry the load generated in the connection portion between the robot and the cart when the robot moves together with the cart, and can reliably restrain the cart from moving with respect to the robot.

A cart according to one aspect of the present disclosure includes a first support to which a plurality of wheels are attached and that includes, at a first end portion of the first support in a first direction, a recess for receiving a part of a robot; and a gripping portion to be gripped by two end effectors of two robot arms provided in the robot. The recess and the gripping portion are arranged at positions in which the gripping portion is gripped by the two end effector in a state in which the part of the robot is fitted into the recess.

According to the above aspect, the cart is moved by the robot in the state in which the part of the robot is fitted into the recess. The fitting portion between the recess and the robot largely reduces the loads received by the end effectors and the robot arms from the cart, and also restrains the movement of the cart with respect to the robot. Therefore, a control of the robot in consideration of a behavior of the cart is simplified.

The cart according to the aspect of the present disclosure may further include a second support that is arranged away from the first support in a second direction intersecting the first direction and that has, on a side opposite to the first support, a placement surface on which an article is placed. The first support and the second support may be arranged such that a sensor provided in the robot is positioned between the first support and the second support in the state in which the part of the robot is fitted into the recess.

According to the above aspect, a scanned range of the sensor is secured by a gap between the first support and the second support. Since the article is placed on the placement surface of the second support, the article on the cart does not affect the scanned range of the sensor. Accordingly, even when the cart moves together with the robot, it is possible to reliably operate the sensor. Therefore, a control of the robot in consideration of a behavior of the cart is simplified.

The cart according to the aspect of the present disclosure may further include, at the first end portion of the first support, a third support supporting the gripping portion. According to the above aspect, in the state in which the part of the robot is fitted into the recess, the third support is restrained from interfering with the scanned range of the sensor.

In the cart according to the aspect of the present disclosure, a second end portion of the second support in the first direction may be fixed to the third support. According to the above aspect, the third support supports the second support.

In the state in which the part of the robot is fitted into the recess, a supported portion of the second support is restrained from interfering with the scanned range of the sensor.

In the cart according to the aspect of the present disclosure, the second support may include, at the second end portion of the second support in the first direction, a recess for receiving a part of the robot. According to the above aspect, the area of the fitting portion between the robot and the cart increases.

The functions of the elements disclosed in the present specification can be implemented by using a circuit or a processing circuit including a general-purpose processor, a dedicated processor, an integrated circuit, an ASIC, a conventional circuit, and/or a combination thereof configured or programmed to implement the disclosed functions. The processor includes a transistor and other circuits, and thus is regarded as a processing circuit or a circuit. In the present disclosure, the circuit, the unit, and the means are hardware that executes the listed functions or hardware that is programmed to execute the listed functions. The hardware may be the hardware disclosed in the present specification, and may be another known hardware configured or programmed to execute the listed functions. When the hardware is a processor considered as a kind of circuit, the circuit, the means, or the unit is a combination of hardware and software, and the software is used for the hardware and/or processor.

The numbers such as the ordinal number and the quantity used above are all illustrated for specifically describing the technique of the present disclosure, and the present disclosure is not limited to the illustrated numbers. The connection relation between the components is illustrated for specifically describing the technique of the present disclosure, and the connection relation implementing the function of the present disclosure is not limited thereto.

Since the scope of the present disclosure is defined by the appended claims rather than the descriptions of the specification so that the present disclosure can be implemented in various forms without departing from the scope of the essential features thereof, the exemplary embodiments and modifications are illustrative and not limited. All changes and equivalents of the claims and the scope thereof are intended to be included in the claims.

The invention claimed is:

1. A robot system, comprising:
a robot including a first robot arm provided with a first end effector, a second robot arm provided with a second end effector, a moving device on which the first robot arm and the second robot arm are mounted, and a control device controlling operations of the first robot arm, the second robot arm, the first end effector, the second end effector, and the moving device; and
a cart that includes a first support to which a plurality of wheels are attached, and a gripping portion to be gripped by the first end effector and the second end effector, wherein
the first support includes a recess for receiving a part of the robot and arranged at a first end portion of the first support in a first direction, and the control device causes the moving device to move the robot together with the cart while causing the first end effector and the second end effector to grip the gripping portion in a state where the part of the robot is fitted into the recess.

2. The robot system according to claim 1, wherein
the robot further includes a sensor that scans a periphery of the robot,
the cart further includes a second support arranged away from the first support in a second direction intersecting the first direction, the second support having a placement surface on which an article is placed on a side opposite to the first support, and
the first support and the second support of the cart are arranged such that the sensor is positioned between the first support and the second support in the state in which the part of the robot is fitted into the recess.

3. The robot system according to claim 2, wherein
the cart further includes a third support supporting the gripping portion and arranged at the first end portion of the first support.

4. The robot system according to claim 3, wherein
a second end portion of the second support in the first direction is fixed to the third support.

5. The robot system according to claim 2, wherein
the second support includes a recess for receiving the part of the robot and arranged at a second end portion of the second support in the first direction.

6. A cart, comprising:
a first support to which a plurality of wheels are attached, the first support including a recess for receiving a part of a robot and arranged at a first end portion of the first support in a first direction; and
a gripping portion to be gripped by two end effectors of two robot arms provided in the robot, and
the recess and the gripping portion are arranged at positions in which the gripping portion is gripped by the two end effector in a state where the part of the robot is fitted into the recess.

7. The cart according to claim 6, further comprising:
a second support arranged away from the first support in a second direction intersecting the first direction, the second support having a placement surface on which an article is placed on a side opposite to the first support, and
the first support and the second support are arranged such that a sensor provided in the robot is positioned between the first support and the second support in the state where the part of the robot is fitted into the recess.

8. The cart according to claim 7, further comprising:
a third support supporting the gripping portion and arranged at the first end portion of the first support.

9. The cart according to claim 8, wherein
a second end portion of the second support in the first direction is fixed to the third support.

10. The cart according to claim 7, wherein
the second support includes a recess for receiving the part of the robot and arranged at a second end portion of the second support in the first direction.

* * * * *